United States Patent
Dejneka et al.

(10) Patent No.: US 12,509,388 B2
(45) Date of Patent: Dec. 30, 2025

(54) IRON- AND MANGANESE-DOPED TUNGSTATE AND MOLYBDATE GLASS AND GLASS-CERAMIC ARTICLES

(71) Applicant: Corning Incorporated, Corning, NY (US)

(72) Inventors: Matthew John Dejneka, Corning, NY (US); Jesse Kohl, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 1119 days.

(21) Appl. No.: 17/430,898

(22) PCT Filed: Feb. 6, 2020

(86) PCT No.: PCT/US2020/017048
§ 371 (c)(1),
(2) Date: Aug. 13, 2021

(87) PCT Pub. No.: WO2020/171967
PCT Pub. Date: Aug. 27, 2020

(65) Prior Publication Data
US 2022/0162114 A1 May 26, 2022

Related U.S. Application Data

(60) Provisional application No. 62/810,564, filed on Feb. 26, 2019, provisional application No. 62/808,010, filed on Feb. 20, 2019.

(51) Int. Cl.
*C03C 4/08* (2006.01)
*C03C 3/097* (2006.01)
(Continued)

(52) U.S. Cl.
CPC ............ *C03C 4/085* (2013.01); *C03C 3/097* (2013.01); *C03C 3/118* (2013.01); *C03C 10/00* (2013.01); *C03C 2204/00* (2013.01)

(58) Field of Classification Search
None
See application file for complete search history.

(56) References Cited

U.S. PATENT DOCUMENTS 3,293,052 A * 12/1966 Sawchuk ............... C03C 4/065
501/13
4,430,257 A 2/1984 Pope et al.
(Continued)

FOREIGN PATENT DOCUMENTS

| CN | 1501892 A | 6/2004 |
|---|---|---|
| CN | 1583624 A | 2/2005 |

(Continued)

OTHER PUBLICATIONS

Korean Patent Application No. 10-2021-7029504, Notice of Allowance dated Sep. 27, 2024, 3 pages (English Translation only), Korean Patent Office.
(Continued)

*Primary Examiner* — Amber R Orlando
*Assistant Examiner* — Paul Alan Forsyth

(57) ABSTRACT

A glass-ceramic that includes: $SiO_2$ from 40 mol % to 80 mol %; $Al_2O_3$ from 3 mol % to 20 mol %; $B_2O_3$ from 3 mol % to 50 mol %; $WO_3$ plus $MoO_3$ from 1 mol % to 18 mol %; $Fe_2O_3$ plus $MnO_2$ from 0.1 mol % to 2 mol %; and $R_2O$ from 0 mol % to 15 mol %. The $R_2O$ is one or more of $Li_2O$, $Na_2O$, $K_2O$, $Rb_2O$ and $Cs_2O$. Further, $R_2O$—$Al_2O_3$ ranges from $-12$ mol % to $+4$ mol %.

19 Claims, 15 Drawing Sheets

(51) Int. Cl.
*C03C 3/118* (2006.01)
*C03C 10/00* (2006.01)

(56) References Cited

U.S. PATENT DOCUMENTS

| | | | |
|---|---|---|---|
| 4,797,232 A * | 1/1989 | Aubert | G21F 9/162 501/12 |
| 5,266,533 A | 11/1993 | Leung et al. | |
| 6,376,084 B1 | 4/2002 | Kishimoto et al. | |
| 9,403,716 B2 | 8/2016 | Dejneka et al. | |
| 9,878,940 B2 | 1/2018 | Baker et al. | |
| 10,112,865 B2 * | 10/2018 | Kiczenski | C03C 3/091 |
| 10,246,371 B1 | 4/2019 | Dejneka et al. | |
| 10,370,291 B2 | 8/2019 | Dejneka et al. | |
| 10,450,220 B2 | 10/2019 | Dejneka et al. | |
| 10,807,906 B2 | 10/2020 | Dejneka et al. | |
| 10,829,408 B2 | 11/2020 | Dejneka et al. | |
| 11,046,609 B2 | 6/2021 | Dejneka et al. | |
| 11,053,159 B2 | 7/2021 | Dejneka et al. | |
| 2005/0037911 A1 * | 2/2005 | Fechner | C03C 3/089 501/67 |
| 2008/0139375 A1 | 6/2008 | Wennemann et al. | |
| 2012/0202676 A1 * | 8/2012 | Bogaerts | C03C 4/005 977/773 |
| 2014/0087194 A1 | 3/2014 | Dejneka et al. | |
| 2015/0321947 A1 | 11/2015 | Beall et al. | |
| 2016/0236972 A1 * | 8/2016 | Kiczenski | C03C 3/091 |
| 2016/0355434 A1 * | 12/2016 | Momono | C03C 21/002 |
| 2017/0362119 A1 | 12/2017 | Dejneka et al. | |
| 2020/0002220 A1 | 1/2020 | Dejneka et al. | |
| 2020/0399167 A1 | 12/2020 | Dejneka et al. | |
| 2020/0399168 A1 | 12/2020 | Dejneka et al. | |
| 2021/0070018 A1 | 3/2021 | Dejneka et al. | |
| 2021/0284570 A1 | 9/2021 | Dejneka et al. | |

FOREIGN PATENT DOCUMENTS

| | | |
|---|---|---|
| CN | 105980147 A | 9/2016 |
| JP | 06-048773 A | 2/1994 |
| JP | 09-241035 A | 9/1997 |
| JP | 2007-238353 A | 9/2007 |
| JP | 2010-053013 A | 3/2010 |
| JP | 2010-248011 A | 11/2010 |
| JP | 2011-256081 A | 12/2011 |
| JP | 2013-508258 A | 3/2013 |
| KR | 10-1476862 B1 | 12/2014 |
| KR | 10-2016-0043008 A | 4/2016 |
| WO | 2019/051408 A2 | 3/2019 |
| WO | 2019/083937 A2 | 5/2019 |
| WO | 2019/113029 A1 | 6/2019 |
| WO | 2019/118664 A1 | 6/2019 |

OTHER PUBLICATIONS

Chinese Patent Application No. 202080015569.9, Office Action, dated Jan. 28, 2023, 5 pages Chinese Patent Office.
International Search Report and Written Opinion of the International Searching Authority; PCT/US20/17048; Mailed Jun. 9, 2020; 10 Pages; Korean Intellectual Property Office.
European Patent Application No. 20758872.4, Extended European Search Report dated Dec. 15, 2022; 10 pages; European Patent Office.
"What are the RCRA 8 Metals?", Available at : https://www.ecoflo.com/2014/12/19/what-are-the-rcra-8-metals/, 2014, 3 pages.
"Wolframite", Available at : https://en.wikipedia.org/wiki/Wolframite, 2021. 2 pages.
Abhudhahir et al., "Synthesis and characterization of Manganese doped Tungsten oxide by Microwave irradiation method", Materials Science in Semiconductor Processing, vol. 40, 2015, pp. 695-700.
Chang et al., "Synthesis of transition metal-doped tungsten oxide nanostructures and their optical properties", Materials Letters, vol. 65, 2011, pp. 1710-1712.

* cited by examiner

IRON- AND MANGANESE-DOPED TUNGSTATE AND MOLYBDATE GLASS AND GLASS-CERAMIC ARTICLES

CROSS-REFERENCE TO RELATED APPLICATION

This application claims the benefit of priority under 35 U.S.C. § 371 of International Patent Application Serial No. PCT/US2020/017048, filed on Feb. 6, 2020, which claims the benefit of priority to U.S. Provisional Application Ser. No. 62/808,010, filed on Feb. 20, 2019, and U.S. Provisional Application Ser. No. 62/810,564, filed on Feb. 26, 2019, the contents of all of which are relied upon and incorporate herein by reference in their entirety as if fully set forth below.

FIELD OF THE DISCLOSURE

The present disclosure generally relates to articles including glasses and/or glass-ceramics, and more specifically, to compositions and methods of forming such articles.

BACKGROUND

Electronic devices such as notebook computers, personal digital assistants (PDAs), portable navigation device (PNDs), media players, mobile phones, portable inventory devices (PIDs), and other portable computing devices have converged while at the same time becoming small, light, and functionally more powerful. One factor contributing to the development and availability of such smaller devices is an ability to increase computational density and operating speed by ever decreasing electronic component sizes. Another factor contributing toward increasing functionality of portable computing devices is an increasing reliance on wireless communication capability (e.g., with microwave and RF frequencies). However, the trend toward smaller, lighter, and more functionally powerful electronic devices presents a continuing challenge regarding design of some components of the portable computing devices.

Components associated with the portable computing devices encountering particular design challenges include the enclosure or housing used to house the various internal/electronic components. One design challenge associated with these enclosures and housings is that they should be transparent to the wireless communication frequencies of the enclosed electronic components. Another design challenge generally arises from two conflicting design goals—the desirability of making the enclosure or housing lighter and thinner, and the desirability of making the enclosure or housing stronger and more rigid. Lighter enclosures or housings, typically thin plastic structures with few fasteners, tend to be more flexible while having a tendency to buckle and bow as opposed to stronger and more rigid enclosure or housings, typically thicker plastic structures with more fasteners having more weight. Unfortunately, plastics are soft materials that are easily scratched and scuffed degrading their appearance.

Glass-ceramics are used widely in various other applications, and are known to be much harder and more scratch resistant than polymers. For example, glass-ceramics are used widely in kitchens as cooktops, cookware, and eating utensils, such as bowls, dinner plates, and the like. As another example, transparent glass-ceramics are used in the production of oven and/or furnace windows, and the like. Nevertheless, these oven- and furnace-oriented glass-ceramics, while having high hardness and scratch resistance are not generally understood as having the desired combination of mechanical properties (e.g., strength) and/or optical properties (e.g., transparency to wireless communication frequencies) suitable for an electronic device housing. Other glasses and glass-ceramics, while suitable for some applications with similar requirements (e.g., optical filters, ophthalmic lenses, aesthetic- and artistic-driven glass applications), contain materials (e.g., cadmium, selenium, and others) that are highly-regulated (and therefore costly or otherwise not practical to manufacture) under federal law, including the Resource Conservation and Recovery Act (RCRA). In addition, other known 'dark' glasses and glass-ceramics that may also be suitable for these same applications, require heat treatments at substantially high temperatures and long durations, and have not been viable in fusion-forming processes.

Accordingly, there exists a need for glass and glass-ceramic materials, compositions and articles, as well as glass and glass-ceramic technologies, that provide improved choices and/or lower manufacturing costs for enclosures or housings of portable computing devices and for components of optical filters, ophthalmic lenses, aesthetic applications, and other applications with similar mechanical and optical property requirements.

SUMMARY OF THE DISCLOSURE

According to an aspect of the disclosure, an article includes: $SiO_2$ from 40 mol % to 80 mol %; $Al_2O_3$ from 3 mol % to 20 mol %; $B_2O_3$ from 3 mol % to 50 mol %; $WO_3$ plus $MoO_3$ from 1 mol % to 18 mol %; $Fe_2O_3$ plus $MnO_2$ from 0.1 mol % to 2 mol %; and $R_2O$ from 0 mol % to 15 mol %. The $R_2O$ is one or more of $Li_2O$, $Na_2O$, $K_2O$, $Rb_2O$ and $Cs_2O$. Further, $R_2O$—$Al_2O_3$ ranges from −12 mol % to +4 mol %.

According to an aspect of the disclosure, an article includes: $SiO_2$ from 50 mol % to 70 mol %; $Al_2O_3$ from 8 mol % to 15 mol %; $B_2O_3$ from 3 mol % to 25 mol %; $WO_3$ plus $MoO_3$ from 2 mol % to 8 mol %; $Fe_2O_3$ plus $MnO_2$ from 0.1 mol % to 2 mol %; and $R_2O$ from 5 mol % to 15 mol %. The $R_2O$ is one or more of $Li_2O$, $Na_2O$, $K_2O$, $Rb_2O$ and $Cs_2O$. Further, $R_2O$—$Al_2O_3$ ranges from −7 mol % to +4 mol %.

According to an aspect of the disclosure, an article includes: $SiO_2$ from 40 mol % to 80 mol %; $Al_2O_3$ from 3 mol % to 20 mol %; $B_2O_3$ from 3 mol % to 50 mol %; $WO_3$ plus $MoO_3$ from 1 mol % to 18 mol %; $Fe_2O_3$ plus $MnO_2$ from 0.1 mol % to 2 mol %; $R_2O$ from 0 mol % to 15 mol %; and at least one amorphous phase and one crystalline phase. The $R_2O$ is one or more of $Li_2O$, $Na_2O$, $K_2O$, $Rb_2O$ and $Cs_2O$. Further, $R_2O$—$Al_2O_3$ ranges from −12 mol % to +4 mol %. In addition, the crystalline phase comprises a plurality of crystalline precipitates, the plurality of crystalline precipitates comprising an oxide of at least one of the chemical form $MWO_4$ and $MMoO_4$, wherein M is $Fe^{2+}$ or $Mn^{2+}$.

According to a first aspect, an article includes: $SiO_2$ from 40 mol % to 80 mol %; $Al_2O_3$ from 3 mol % to 20 mol %; $B_2O_3$ from 3 mol % to 50 mol %; $WO_3$ plus $MoO_3$ from 1 mol % to 18 mol %; $Fe_2O_3$ plus $MnO_2$ from 0.1 mol % to 2 mol %; and $R_2O$ from 0 mol % to 15 mol %. The $R_2O$ is one or more of $Li_2O$, $Na_2O$, $K_2O$, $Rb_2O$ and $Cs_2O$. Further, $R_2O$—$Al_2O_3$ ranges from −12 mol % to +4 mol %.

According to a second aspect, the article of the first aspect is provided, as further comprising: F from 1 mol % to 10 mol %.

According to a third aspect, the article of the first or the second aspect is provided, wherein $WO_3$ is from 2 mol % to 15 mol %.

According to a fourth aspect, the article of any one of the first through third aspects is provided, wherein $MoO_3$ is from 2 mol % to 15 mol %.

According to a fifth aspect, the article of any of the first through fourth aspects is provided, as further comprising: $SnO_2$ from 0.01 mol % to 1 mol %.

According to a sixth aspect, the article of any of the first through fifth aspects is provided, as further comprising: RO from 0.1 mol % to 2 mol %, wherein RO is one or more of MgO, CaO, SrO, ZnO, and BaO.

According to a seventh aspect, the article of any one of the first through sixth aspects is provided, wherein the article exhibits an average absorbance of at least 5 OD/mm in an ultraviolet (UV) wavelength band from 300 nm to 400 nm and an average absorbance of at least 2 OD/mm in a visible wavelength band from 400 nm to 700 nm.

According to an eighth aspect, the article of any one of the first through sixth aspects is provided, wherein the article comprises an optical transmittance of at least 50% from 700 nm to 3000 nm and a sharp cutoff wavelength from 320 nm to 525 nm.

According to a ninth aspect, the article of any one of the first through eighth aspects is provided, wherein the article exhibits a haze of 10% or less at a thickness of 1 mm.

According to a tenth aspect, an article includes: $SiO_2$ from 50 mol % to 70 mol %; $Al_2O_3$ from 8 mol % to 15 mol %; $B_2O_3$ from 3 mol % to 25 mol %; $WO_3$ plus $MoO_3$ from 2 mol % to 8 mol %; $Fe_2O_3$ plus $MnO_2$ from 0.1 mol % to 2 mol %; and $R_2O$ from 5 mol % to 15 mol %, wherein the $R_2O$ is one or more of $Li_2O$, $Na_2O$, $K_2O$, $Rb_2O$ and $Cs_2O$. Further, $R_2O$—$Al_2O_3$ ranges from −7 mol % to +4 mol %.

According to an eleventh aspect, the article of the tenth aspect is provided, as further comprising: F from 4 mol % to 8 mol %.

According to a twelfth aspect, the article of any one of the tenth or eleventh aspects is provided, wherein $WO_3$ is from 3 mol % to 7 mol %.

According to a thirteenth aspect, the article of any one of the tenth through twelfth aspects is provided, wherein $MoO_3$ is from 2 mol % to 5 mol %.

According to a fourteenth aspect, the article of any one of the tenth through thirteenth aspects is provided, as further comprising: $SnO_2$ from 0.1 mol % to 0.5 mol %.

According to a fifteenth aspect, the article of any one of the tenth through fourteenth aspects is provided, as further comprising: RO from 0.1 mol % to 2 mol %. Further, RO is one or more of MgO, CaO, SrO, ZnO, and BaO.

According to a sixteenth aspect, the article of any one of the tenth through fifteenth aspects is provided, wherein the article exhibits an average absorbance of at least 7 OD/mm in an ultraviolet (UV) wavelength band from 300 nm to 400 nm and an average absorbance of at least 5 OD/mm in a visible wavelength band from 400 nm to 700 nm.

According to a seventeenth aspect, the article of any one of the tenth through fifteenth aspects is provided, wherein the article comprises an optical transmittance of at least 50% from 700 nm to 3000 nm and a sharp cutoff wavelength from 320 nm to 525 nm.

According to an eighteenth aspect, the article of any one of the tenth through seventeenth aspects is provided, wherein the article exhibits a haze of 5% or less at a thickness of 1 mm.

According to a nineteenth aspect, an article includes: $SiO_2$ from 40 mol % to 80 mol %; $Al_2O_3$ from 3 mol % to 20 mol %; $B_2O_3$ from 3 mol % to 50 mol %; $WO_3$ plus $MoO_3$ from 1 mol % to 18 mol %; $Fe_2O_3$ plus $MnO_2$ from 0.1 mol % to 2 mol %; $R_2O$ from 0 mol % to 15 mol %, wherein the $R_2O$ is one or more of $Li_2O$, $Na_2O$, $K_2O$, $Rb_2O$ and $Cs_2O$; and at least one amorphous phase and one crystalline phase. Further, $R_2O$—$Al_2O_3$ ranges from −12 mol % to +4 mol % and the crystalline phase comprises a plurality of crystalline precipitates, the plurality of crystalline precipitates comprising an oxide of at least one of the chemical form $MWO_4$ and $MMoO_4$, wherein M is $Fe^{2+}$ or $Mn^{2+}$.

According to a twentieth aspect, the article of the nineteenth aspect is provided, as further comprising: one or more dopants selected from the group consisting of H, S, Cl, Ti, V, Cr, Co, Ni, Cu, Ga, Se, Br, Zr, Nb, Ru, Rh, Pd, Ag, Cd, In, Sb, Te, I, La, Ce, Pr, Nd, Sm, Eu, Gd, Tb, Dy, Ho, Er, Tm, Yb, Lu, Ta, Os, Ir, Pt, Au, Ti, Pb, Bi and U. Further, the one or more dopants is present from 0.0001 mol % to 0.5 mol %.

According to a twenty-first aspect, the article of any one of the nineteenth or twentieth aspects is provided, wherein the article exhibits an average absorbance of at least 5 OD/mm in an ultraviolet (UV) wavelength band from 300 nm to 400 nm and an average absorbance of at least 2 OD/mm in a visible wavelength band from 400 nm to 700 nm.

According to a twenty-second aspect, the article of any one of the nineteenth or twentieth aspects is provided, wherein the article comprises an optical transmittance of at least 50% from 700 nm to 3000 nm and a sharp cutoff wavelength from 320 nm to 525 nm.

According to a twenty-third aspect, the article of any one of the nineteenth through the twenty-second aspects is provided, wherein the plurality of crystalline precipitates comprises a longest length dimension of from 1 nm to 500 nm, as measured by Electron Microscopy.

These and other features, advantages, and objects of the present disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1:
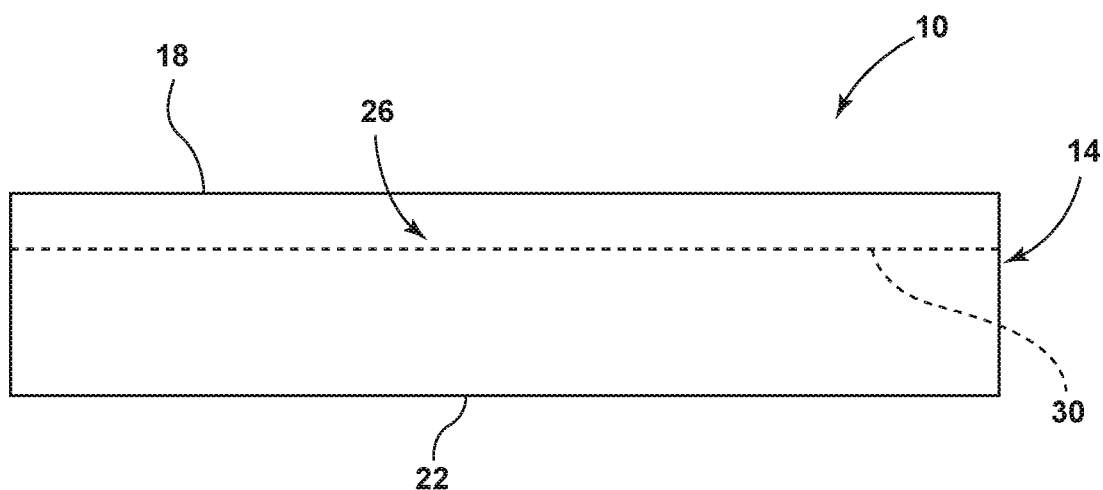
FIG. 1 is a cross-sectional view of an article, according to at least one example of the disclosure.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

Unless otherwise specified, all compositions are expressed in terms of as-batched mole percent (mol %). As will be understood by those having ordinary skill in the art, various melt constituents (e.g., fluorine, alkali metals, boron, etc.) may be subject to different levels of volatilization (e.g., as a function of vapor pressure, melt time and/or melt temperature) during melting of the constituents. As such, the as-batched mole percent values used in relation to such constituents are intended to encompass values within ±0.2 mol % of these constituents in final, as-melted articles. With the forgoing in mind, substantial compositional equivalence between final articles and as-batched compositions is expected.

For purposes of this disclosure, the terms "bulk," "bulk composition" and/or "overall compositions" are intended to include the overall composition of the entire article, which may be differentiated from a "local composition" or "localized composition" which may differ from the bulk composition owing to the formation of crystalline and/or ceramic phases.

As also used herein, the terms "article," "glass-article," "ceramic-article," "glass-ceramics," "glass elements," "glass-ceramic article" and "glass-ceramic articles" may be used interchangeably, and in their broadest sense, to include any object made wholly or partly of glass and/or glass-ceramic material.

As used herein, a "glass state" refers to an inorganic amorphous phase material within the articles of the disclosure that is a product of fusion that has cooled to a rigid condition without crystallizing. As used herein, a "glass-ceramic state" refers to an inorganic material within the articles of the disclosure which includes both the glass state and a "crystalline phase" and/or "crystalline precipitates" as described herein.

As used herein, "transmission", "transmittance", "optical transmittance" and "total transmittance" are used interchangeably in the disclosure and refer to external transmission or transmittance, which takes absorption, scattering and reflection into consideration. Fresnel reflection is not subtracted out of the transmission and transmittance values reported herein. In addition, any total transmittance values referenced over a particular wavelength range are given as an average of the total transmittance values measured over the specified wavelength range. Further, as also used herein, "average absorbance" is given as (2-log(average transmittance, %))/path length.

As used herein, "optical density units", "OD" and "OD units" are used interchangeably in the disclosure to refer to optical density units, as commonly understood as a measure of absorbance of the material tested, as measured with a spectrometer given by OD=–log $(I/I_0)$ where $I_0$ is the intensity of light incident on the sample and I is the intensity of light that is transmitted through the sample. Further, the terms "OD/mm" or "OD/cm" used in this disclosure are normalized measures of absorbance, as determined by dividing the optical density units (i.e., as measured by an optical spectrometer) by the thickness of the sample (e.g., in units of millimeters or centimeters). In addition, any optical density units referenced over a particular wavelength range (e.g., 3.3 OD/mm to 24.0 OD/mm in UV wavelengths from 280 nm to 380 nm) are given as an average value of the optical density units over the specified wavelength range.

As also used herein, the terms "sharp cutoff wavelength" and "cutoff wavelength" are interchangeably used in the disclosure and refer to a cutoff wavelength within a range of 320 nm to 525 nm in which the glass-ceramic has a substantially higher transmittance above the cutoff wavelength ($\lambda_c$) in comparison to its transmittance below the cutoff wavelength ($\lambda_c$). The cutoff wavelength ($\lambda_c$) is the wavelength at the midpoint between an "absorption limit wavelength" and a "high transmittance limit wavelength" in the given spectra for the glass-ceramic. The "absorption limit wavelength" is specified as the wavelength in which the transmittance is 5%; and the "high transmittance wavelength" is defined as the wavelength in which the transmittance is 72%.

As used herein, the term "haze" refers to the percentage of transmitted light scattered outside an angular cone of ±2.5° in a sample having a transmission path of 1 mm and measured in accordance with ASTM procedure D1003.

As it relates to the glass-ceramic and glass-ceramic materials and articles of the disclosure, compressive stress and depth of compression ("DOC") are measured by evaluating surface stress using commercially available instruments, such as the scattered light polariscope SCALP220 and accompanying software version 5 manufactured by GlassStress, Ltd. (Tallinn, Estonia), or the FSM-6000, manufactured by Orihara Co., Lt. (Tokyo, Japan), unless otherwise noted herein. Both instruments measure optical retardation which must be converted to stress via the stress optic coefficient ("SOC") of the material being tested. Thus, stress measurements rely upon the accurate measurement of the SOC, which is related to the birefringence of the glass. SOC in turn is measured according to a modified version of Procedure C, which is described in ASTM standard C770-98 (2013) ("modified Procedure C"), entitled "Standard Test Method for Measurement of Glass Stress-Optical Coefficient," the contents of which is incorporated herein by reference in its entirety. The modified Procedure C includes using a glass or glass-ceramic disc as the specimen having a thickness of 5 to 10 mm and a diameter of 12.7 mm. The disc is isotropic and homogeneous, and is core-drilled with both faces polished and parallel. The modified Procedure C also includes calculating the maximum force, Fmax, to be applied to the disc. The force should be sufficient to produce at least 20 MPa compression stress. Fmax is calculated using the equation:

$$F\max = 7.854 * D * h$$

where Fmax is the maximum force (N), D is the diameter of the disc (mm), and h is the thickness of the light path (mm). For each force applied, the stress is computed using the equation:

$$\sigma(MPa) = 8F/(\pi * D * h)$$

where F is the force (N), D is the diameter of the disc (mm), and h is the thickness of the light path (mm).

Unless otherwise noted herein, the term "substantially free" means that the specified element or constituent (e.g., Cd, Se) is not intentionally or purposefully included in the referenced glass, glass-ceramic or article, and that any measurable amounts of the specified element or constituent are present at <500 ppm.

Articles of the present disclosure are composed of glass and/or glass-ceramics having one or more of the compositions outlined herein. The articles have scratch resistance, strength, light weight, relatively low processing costs, and particular optical properties suitable for use as housing and structural components in portable electronic devices and as optical elements and filters. As such, the articles of the disclosure can be employed in any number of applications. For example, the articles can be employed in the form of substrates, filters, elements, lenses, covers and/or other elements in any number of optics-related and/or aesthetic applications. As another example, the articles can be employed as housings, covers, enclosures and the like for notebook computers, personal digital assistants (PDAs), portable navigation device (PNDs), media players, mobile phones, portable inventory devices (PIDs), and other portable computing devices.

In general, the articles of the disclosure are formed from an as-batched composition and are cast in a glass state. The articles may later be annealed and/or thermally processed (e.g., heat treated) to form a glass-ceramic state having a plurality of ceramic or crystalline particles, precipitates and the like. It will be understood that depending on the casting technique employed, the volume of glass cast, and the casting geometry, the article may readily crystallize and become a glass-ceramic without additional heat treatment (e.g., essentially be cast into the glass-ceramic state). In examples where a post-forming thermal processing is employed, a portion, a majority, substantially all or all of the article may be converted from the glass state to the glass-ceramic state. As such, although compositions of the article may be described in connection with the glass state and/or the glass-ceramic state, the bulk composition of the article may remain substantially unaltered when converted between the glass and glass-ceramic states, despite localized portions of the article having different compositions (i.e., owing to the formation of the ceramic or crystalline precipitates).

According to various examples, the article may include $Al_2O_3$, $SiO_2$, $B_2O_3$, $WO_3$ and/or $MO_3$, $Fe_2O_3$ and/or $MnO_2$, and $R_2O$ where $R_2O$ is one or more of $Li_2O$, $Na_2O$, $K_2O$, $Rb_2O$ and $Cs_2O$. Further, the article can include RO where RO is one or more of MgO, CaO, SrO, BaO and ZnO and/or a number of dopants. It will be understood that a number of other constituents (e.g., F, As, Sb, Ti, P, Ce, Eu, La, Cl, Br, $SnO_2$, etc.) can be included in the article without departing from the teachings provided herein.

Referring now to FIG. 1, an article 10 is depicted that includes a substrate 14 having a glass and/or glass-ceramic composition according to the disclosure. The article 10 can be employed in any number of applications. For example, the article 10 and/or substrate 14 can be employed in the form of substrates, elements, covers and other elements in any number of optics related and/or aesthetic applications.

The substrate 14 defines or includes a pair of opposing primary surfaces 18 and 22. In some examples of the article 10, the substrate 14 includes a compressive stress region 26. As shown in FIG. 1, the compressive stress region 26 extends from the primary surface 18 to a first selected depth 30 in the substrate. In some examples, the substrate 14 includes a comparable compressive stress region 26 that extends from the primary surface 18 to a second selected depth (not shown). Further, in some examples, multiple compressive stress regions 26 may extend from the primary surfaces 18 and 22 and/or edges of the substrate 14. The substrate 14 may have a selected length and width, or diameter, to define its surface area. The substrate 14 may have at least one edge between the primary surfaces 18 and 22 of the substrate 14 defined by its length and width, or diameter. The substrate 14 may also have a selected thickness.

As used herein, a "selected depth," (e.g., selected depth 30) "depth of compression" and "DOC" are used interchangeably to define the depth at which the stress in the substrate 14, as described herein, changes from compressive to tensile. DOC may be measured by a surface stress meter, such as an FSM-6000, or a scattered light polariscope (SCALP) depending on the ion exchange treatment. Where the stress in a substrate 14 having a glass or a glass-ceramic composition is generated by exchanging potassium ions into the glass substrate, a surface stress meter is used to measure DOC. Where the stress is generated by exchanging sodium ions into the glass article, SCALP is used to measure DOC. Where the stress in the substrate 14 having a glass or glass-ceramic composition is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrates is measured by a surface stress meter. As also used herein, the "maximum compressive stress" is defined as the maximum compressive stress within the compressive stress region 26 in the substrate 14. In some examples, the maximum compressive stress is obtained at or in close proximity to the one or more primary surfaces 18 and 22 defining the compressive stress region 26. In other examples, the maximum compressive stress is obtained between the one or more primary surfaces 18 and 22 and the selected depth 30 of the compressive stress region 26.

In some examples of the article 10, as depicted in exemplary form in FIG. 1, the substrate 14 is selected from a chemically strengthened alumino-boro-silicate glass or glass-ceramic. For example, the substrate 14 can be selected from chemically strengthened alumino-boro-silicate glass or glass-ceramic having a compressive stress region 26 extending to a first selected depth 30 of greater than 10 µm, with a maximum compressive stress of greater than 150 MPa. In further examples, the substrate 14 is selected from a chemically strengthened alumino-boro-silicate glass or glass-ceramic having a compressive stress region 26 extending to a first selected depth 30 of greater than 25 µm, with a maximum compressive stress of greater than 400 MPa. The substrate 14 of the article 10 may also include one or more compressive stress regions 26 that extend from one or more of the primary surfaces 18 and 22 to a selected depth 30 (or depths) having a maximum compressive stress of greater than 150 MPa, greater than 200 MPa, greater than 250 MPa, greater than 300 MPa, greater than 350 MPa, greater than 400 MPa, greater than 450 MPa, greater than 500 MPa, greater than 550 MPa, greater than 600 MPa, greater than 650 MPa, greater than 700 MPa, greater than 750 MPa, greater than 800 MPa, greater than 850 MPa, greater than 900 MPa, greater than 950 MPa, greater than 1000 MPa, and all maximum compressive stress levels between these values. In some examples, the maximum compressive stress is 2000 MPa or lower. In addition, the depth of compression (DOC) or first selected depth 30 can be set at 10 µm or greater, 15 µm or greater, 20 µm or greater, 25 µm or greater, 30 µm or greater, 35 µm or greater, and to even higher depths, depending on the thickness of the substrate 14 and the processing conditions associated with generating the compressive stress region 26. In some examples, the DOC is less than or equal to 0.3 times the thickness (t) of the substrate 14, for example, 0.3*t, 0.28*t, 0.26*t, 0.25*t, 0.24*t, 0.23*t, 0.22*t, 0.21*t, 0.20*t, 0.19*t, 0.18*t, 0.15*t, 0.10*t, and all values therebetween.

As will be explained in greater detail below, the article 10 is formed from an as-batched composition and is cast in a glass state. The article 10 may later be annealed and/or thermally processed (e.g., heat treated) to form a glass-ceramic state having a plurality of ceramic or crystalline particles. It will be understood that depending on the casting technique employed, the article 10 may readily crystallize and become a glass-ceramic without additional heat treatment (e.g., essentially be cast into the glass-ceramic state). In examples where a post-forming thermal processing is employed, a portion, a majority, substantially all or all of the article 10 may be converted from the glass state to the glass-ceramic state. As such, although compositions of the article 10 may be described in connection with the glass state and/or the glass-ceramic state, the bulk composition of the article 10 may remain substantially unaltered when converted between the glass and glass-ceramic states, despite localized portions of the article 10 having a different composition (i.e., owing to the formation of the ceramic or crystalline precipitates). Further, it will be understood that while the compositions are described in terms of an as-batched state, one having ordinary skill in the art will recognize which constituents of the article 10 may volatize in the melting process (i.e., and therefore be less present in the article 10 relative to the as-batched composition) and others which will not.

According to various examples, the article 10 may include $Al_2O_3$, $SiO_2$, $B_2O_3$, $WO_3$ and/or $MO_3$, $Fe_2O_3$ and/or $MnO_2$, and $R_2O$ where $R_2O$ is one or more of $Li_2O$, $Na_2O$, $K_2O$, $Rb_2O$ and $Cs_2O$. The article 10 may also include RO where RO is one or more of MgO, CaO, SrO, BaO and ZnO and/or any number of dopants (e.g., $SnO_2$, F, $P_2O_5$, etc.). Unless otherwise noted, glass compositions correspond to as-batched mole percentage (mol %) in a crucible for melting.

The article 10 may have from 40 mol % to 80 mol % $SiO_2$, or from 45 mol % to 75 mol % $SiO_2$, or from 50 mol % to 70 mol % $SiO_2$, or from 50 mol % to 75 mol % $SiO_2$ or from 50 mol % to 56 mol % $SiO_2$. For example, the article 10 may have 42 mol %, 44 mol %, 46 mol %, 48 mol %, 50 mol %, 52 mol %, 54 mol %, 56 mol %, 58 mol %, 60 mol %, 62 mol %, 64 mol %, 66 mol %, 68 mol %, 70 mol %, 72 mol %, 74 mol %, 76 mol % or 78 mol % $SiO_2$. It will be understood that any and all values and ranges between the above noted ranges of $SiO_2$ are contemplated.

The article 10 may include from 3 mol % to 15 mol % $Al_2O_3$, or from 5 mol % to 15 mol % $Al_2O_3$, or from 7 mol % to 15 mol % $Al_2O_3$, or from 8 mol % to 15 mol % $Al_2O_3$, or from 7 mol % to 12 mol % $Al_2O_3$, or from 10 mol % to 12 mol % $Al_2O_3$. For example, the article 10 may have 3 mol %, 4 mol %, 5 mol %, 6 mol %, 7 mol %, 8 mol %, 9 mol %, 10 mol %, 11 mol %, 12 mol %, 13 mol %, 14 mol %, or 15 mol % $Al_2O_3$. It will be understood that any and all values and ranges between the above noted ranges of $Al_2O_3$ are contemplated.

The article 10 includes $WO_3$ and/or $MoO_3$. The combined amount of $WO_3$ and $MoO_3$ is referred to herein as "$WO_3$ plus $MoO_3$" where it is understood that "$WO_3$ plus $MoO_3$" refers to $WO_3$ alone, $MoO_3$ alone, or a combination of $WO_3$ and $MoO_3$. For example, $WO_3$ plus $MoO_3$ may be from 1 mol % to 18 mol %, or from 2 mol % to 10 mol %, or from 2 mol % to 8 mol %, or from 3.5 mol % to 8 mol %, or from 3 mol to 6 mol %. With respect to $WO_3$, the article 10 may have from 0 mol % to 18 mol %, or from 1 mol % to 15 mol %, or from 2 mol % to 15 mol %, or from 1 mol % to 7 mol %, or from 3 mol % to 7 mol %, or from 2 mol % to 4 mol %. For example, the article may have 0 mol %, 1 mol %, 2 mol %, 3 mol %, 4 mol %, 5 mol %, 6 mol %, 7 mol %, 8 mol %, 9 mol %, 10 mol %, 11 mol %, 12 mol %, 13 mol %, 14 mol % $WO_3$. With respect to $MoO_3$, the article 10 may have from 0 mol % to 18 mol %, or from 1 mol % to 15 mol %, or from 2 mol % to 15 mol %, or from 2 mol % to 5 mol %, or from 1 mol % to 7 mol %, or from 1 mol % to 4 mol %. For example, the article may have 0 mol %, 1 mol %, 2 mol %, 3 mol %, 4 mol %, 5 mol %, 6 mol %, 7 mol %, 8 mol %, 9 mol %, 10 mol %, 11 mol %, 12 mol %, 13 mol %, or 14 mol % $MoO_3$. It will be understood that any and all values and ranges between the above noted ranges of $WO_3$, $WO_3$ plus $MoO_3$, and/or $MoO_3$ amounts are contemplated.

The article 10 may include from 3 mol % to 50 mol % $B_2O_3$, or from 3 mol % to 25 mol % of $B_2O_3$, or from 10 mol % to 20 mol % $B_2O_3$, or from 10 mol % to 15 mol % $B_2O_3$. For example, the article 10 may have 3 mol %, 5 mol %, 10 mol %, 15 mol %, 20 mol %, 25 mol %, 30 mol %, 35 mol %, 40 mol %, 45 mol %, or 50 mol % $B_2O_3$. It will be understood that any and all values and ranges between the above noted ranges of $B_2O_3$ are contemplated.

The article 10 can include at least one alkali metal oxide. The alkali metal oxide may be represented by the chemical formula $R_2O$ where $R_2O$ is one or more of $Li_2O$, $Na_2O$, $K_2O$, $Rb_2O$, $Cs_2O$ and/or combinations thereof. The article 10 may have $R_2O$ from 0 mol % to 20 mol %, or 0 mol % to 15 mol %, or from 5 mol % to 15 mol %, or from 8 mol % to 15 mol %, or from 10 mol % to 15 mol % $R_2O$. For example, the article 10 may have 0 mol %, 1 mol %, 1.1 mol %, 2 mol %, 3 mol %, 4 mol %, 5 mol %, 6 mol %, 7 mol %, 8 mol %, 9 mol %, 10 mol %, 11 mol %, 12 mol %, 13 mol %, 14 mol %, 15 mol %, 16 mol %, 17 mol %, 18 mol %, 19 mol %, or 20 mol % $R_2O$. It will be understood that any and all values and ranges between the above noted ranges of $R_2O$ are contemplated.

The article 10 has an alkali content such that $R_2O$ minus $Al_2O_3$ (i.e., the difference between the amount of $R_2O$ and $Al_2O_3$) ranges from −12 mol % to +4 mol %, or from −7 mol % to +4 mol %, or from −3 mol % to +4 mol %, or from 0 mol % to +4 mol %, or from +0.5 mol % to +4 mol %, or from +1 mol % to +4 mol %, or from +1 mol % to +3 mol %, or from +1 mol % to +2 mol %. It will be understood that any and all values and ranges between the above noted ranges of $R_2O$ minus $Al_2O_3$ are contemplated. The difference in $R_2O$ and $Al_2O_3$ specified herein influences the availability of excess alkali cations to interact with tungsten oxide, thereby modulating or otherwise controlling the formation of alkali tungsten bronzes, e.g. non-stoichiometric tungsten sub-oxides ($M_xWO_3$ crystals with x>0.3) and stoichiometric alkali tungstates (e.g., $Na_2WO_4$). Without being bound by theory, the excess alkali in the glass of article 10 enables more of it intercalate into the tungsten crystal to form higher dopant concentration bronze crystals, which can produce further absorbance changes upon various levels of crystallization (e.g., through post-melt heat treatments). Put another way, the excess alkali levels can allow greater variations in the $M_xWO_3$ crystal stoichiometry, resulting in more significant shifts in band gap energy which is manifested in changes in absorbance.

The article includes $Fe_2O_3$ and/or $MnO_2$. The combined amount of $Fe_2O_3$ and $MnO_2$ is referred to herein as "$Fe_2O_3$ plus $MnO_2$" where it is understood that "$Fe_2O_3$ plus $MnO_2$" refers to $Fe_2O_3$ alone, $MnO_2$ alone, or a combination of $Fe_2O_3$ and $MnO_2$. For example, $Fe_2O_3$ plus $MnO_2$ may be from 0.1 mol % to 5 mol %, or from 0.1 mol % to 2 mol %, or from 0.1 mol % to 1.5 mol %, or from 0.2 mol % to 1 mol %. With respect to $Fe_2O_3$, the article 10 may have from 0.1 mol % to 5 mol %, or from 0.1 mol % to 2 mol %, or from 0.1 mol % to 1.5 mol %, or from 0.2 mol % to 1 mol %. For example, the article may have 0.1 mol %, 0.2 mol %, 0.3 mol %, 0.4 mol %, 0.5 mol %, 0.6 mol %, 0.7 mol %, 0.8 mol %, 0.9 mol %, 1 mol %, 1.1 mol %, 1.2 mol %, 1.3 mol %, 1.4 mol %, 1.5 mol %, 2 mol %, 2.5 mol %, 3 mol %, 3.5 mol %, 4 mol %, 4.5 mol % and 5 mol % $Fe_2O_3$. With respect to $MnO_2$, the article 10 may have from 0.1 mol % to 5 mol %, or from 0.1 mol % to 2 mol %, or from 0.1 mol % to 1.5 mol %, or from 0.2 mol % to 1 mol %. For example, the article may have 0.1 mol %, 0.2 mol %, 0.3 mol %, 0.4 mol %, 0.5 mol %, 0.6 mol %, 0.7 mol %, 0.8 mol %, 0.9 mol %, 1 mol %, 1.1 mol %, 1.2 mol %, 1.3 mol %, 1.4 mol %, 1.5 mol %, 2 mol %, 2.5 mol %, 3 mol %, 3.5 mol %, 4 mol %, 4.5 mol % and 5 mol % $MnO_2$. It will be understood that any and all values and ranges between the above noted ranges of $Fe_2O_3$, $Fe_2O_3$ plus $MnO_2$, and/or $MnO_2$ amounts are contemplated.

The article 10 may also include at least one alkaline earth metal oxide and/or ZnO. The alkaline earth metal oxide may be represented by the chemical formula RO where RO is one or more of MgO, CaO, SrO and BaO. RO may also include ZnO. The article 10 may include RO from 0 mol % to 5 mol % RO, or from 0 mol % to 3 mol % RO, or from 0 mol % to 2 mol % RO, or from 0.1 mol % to 2 mol % RO, or from 0 mol % to 1 mol % RO, or from 0.01 mol % to 1 mol % RO, or from 0.05 mol % to 0.5 mol % RO. It will be understood that any and all values and ranges between the above noted ranges of RO (as inclusive of ZnO) are contemplated. According to various examples, the amount of $R_2O$ may be greater than the amount of RO and/or ZnO. Further, embodiments of the article 10 may be substantially free of RO and/or ZnO.

The article 10 may also include $SnO_2$, from 0.01 mol % to 1 mol % $SnO_2$, or from 0.05 mol % to 0.5 mol % $SnO_2$, or from 0.1 mol % to 0.5 mol % $SnO_2$, or from 0.15 mol % to 0.5 mol % $SnO_2$. For example, the article 10 can include 0.01 mol % $SnO_2$, 0.02 mol % $SnO_2$, 0.03 mol % $SnO_2$, 0.04 mol % $SnO_2$, 0.05 mol % $SnO_2$, 0.06 mol % $SnO_2$, 0.07 mol % $SnO_2$, 0.08 mol % $SnO_2$, 0.09 mol % $SnO_2$, 0.1 mol % $SnO_2$, 0.5 mol % $SnO_2$, and 1 mol % $SnO_2$. It will be understood that any and all values and ranges between the above noted ranges of $SnO_2$ are contemplated. Without being bound by theory, the tin oxide levels in article 10 and the compositions of the present disclosure can play an important role in the partial reduction of the tungsten bronze crystal (e.g., with some degree of synergy with the excess alkali content in the compositions), which is a component that may greatly facilitate obtaining further stoichiometry variations (i.e., larger x values in the $M_xWO_3$ non-stoichiometric crystals, which require more $W^{6+}$ to be reduced to $W^{5+}$).

According to various examples, the article 10 can be doped with P (in the form of $P_2O_5$) and/or F (in the form of $F^-$ ions). For example, the article 10 can include from 0 mol % to 3 mol % $P_2O_5$, or from 0 mol % to 2 mol % $P_2O_5$, or from 0 mol % to 1.5 mol % $P_2O_5$. The article 10 can also include F from 0 mol % to 15 mol %, or from 1 mol % to 10 mol %, or from 3 mol % to 7 mol %, or from 4 mol % to 8 mol %. Further, any and all values and ranges between the above-noted ranges of $P_2O_5$ and/or F are contemplated for use in article 10 and the compositions of the disclosure. Without being bound by theory, the articles 10 containing $P_2O_5$ and/or F can be 'softer' from a viscosity standpoint as these dopants can be added at the expense of some amount of $SiO_2$. Further, such 'softer' compositions can enable increased alkali metal oxides partitioning into the W-containing crystals as there is less $SiO_2$ to compete with the alkali metal oxides. Further, the increased viscosity curve associated with these 'softer' compositions can also influence the rate of diffusion of the alkali metal oxides into the tungsten crystals. With increased alkali metal oxide partitioning into the W-containing crystals, additional absorbance-changing effects can be obtained with one composition through varying heat treatments.

In various examples, the article 10 is substantially free of Cd and Se. Unless otherwise noted herein, the term "substantially free" means that the specified element or constituent is not intentionally included in the article 10 and any measurable amounts that are present in the article 10 are present at <500 ppm. In some embodiments, the articles 10 can be substantially free of Cd, Se and/or any other element subject to regulation under RCRA.

According to various examples, the article 10 can further include at least one dopant selected from the group consisting of H, S, Cl, Ti, V, Cr, Co, Ni, Cu, Ga, Se, Br, Zr, Nb, Ru, Rh, Pd, Ag, Cd, In, Sb, Te, I, La, Ce, Pr, Nd, Sm, Eu, Gd, Tb, Dy, Ho, Er, Tm, Yb, Lu, Ta, Os, Ir, Pt, Au, Ti, Pb, Bi and U to alter the ultraviolet, visual, color and/or near-infrared absorbance. The dopants may have concentration within the glass composition of from 0.0001 mol % to 1.0 mol %, from 0.0001 mol % to 0.5 mol %, or from 0.0001 mol % to 0.1 mol %. For example, the article 10 may contain any one or more of the foregoing dopants at a concentration of 0.0001 mol %, 0.001 mol %, 0.01 mol %, 0.1 mol %, 0.5 mol %, and 1 mol %. It will be understood that any and all values and ranges between the above noted ranges of these dopants are contemplated.

It will be understood that each of the above noted compositions and composition ranges for $SiO_2$, $Al_2O_3$, $WO_3$, $MoO_3$, $WO_3$ plus $MoO_3$, $B_2O_3$, $Fe_2O_3$ plus $MnO_2$, $R_2O$, RO, $P_2O_5$, F, $SnO_2$, and dopants may be used with any other composition and/or composition range of the other constituents of the glass as outlined herein. For example, Tables 1A, 1B and 1C provide exemplary composition ranges of the article 10 in an as-batched mol %.

TABLE 1A

Fe- and Mn-doped $WO_3$ and $MoO_3$ glass-ceramic compositions

| Constituent | Min. | Max. |
|---|---|---|
| $SiO_2$ | 40 | 80 |
| $Al_2O_3$ | 3 | 20 |
| $B_2O_3$ | 3 | 50 |
| $R_2O$ | 0 | 15 |
| RO | 0 | 3 |
| $P_2O_5$ | 0 | 3 |
| F | 0 | 15 |
| $SnO_2$ | 0 | 1 |
| $MoO_3$ plus $WO_3$ | 1 | 18 |
| $Fe_2O_3$ plus $MnO_2$ | 0.1 | 2 |
| $R_2O$ minus $Al_2O_3$ | −12 | +4 |

TABLE 1B

Fe- and Mn-doped $WO_3$ and $MoO_3$ glass-ceramic compositions

| Constituent | Min. | Max. |
|---|---|---|
| $SiO_2$ | 50 | 70 |
| $Al_2O_3$ | 8 | 15 |
| $B_2O_3$ | 3 | 25 |
| $R_2O$ | 5 | 15 |
| RO | 0 | 2 |
| $P_2O_5$ | 0 | 2 |
| F | 0 | 8 |
| $SnO_2$ | 0 | 0.5 |
| $MoO_3$ plus $WO_3$ | 2 | 8 |
| $Fe_2O_3$ plus $MnO_2$ | 0.1 | 2 |
| $R_2O$ minus $Al_2O_3$ | −7 | +4 |

TABLE 1C

Fe- and Mn-doped $WO_3$ and $MoO_3$ glass-ceramic compositions

| Constituent | Min. | Max. |
|---|---|---|
| $SiO_2$ | 53 | 67 |
| $Al_2O_3$ | 10 | 14 |
| $B_2O_3$ | 3 | 15 |
| $R_2O$ | 8 | 13 |
| RO | 0 | 0.5 |
| $P_2O_5$ | 0 | 2 |
| F | 0 | 6 |
| $SnO_2$ | 0.1 | 0.3 |
| $MoO_3$ plus $WO_3$ | 3 | 6 |
| $Fe_2O_3$ plus $MnO_2$ | 0.2 | 2 |
| $R_2O$ minus $Al_2O_3$ | −7 | +3 |

Formation in conventional tungsten- or mixed tungsten molybdenum-containing alkali glasses has been hampered by the separation of the melt constituents during the melting process. The separation of the glass constituents during the melting process resulted in a perceived solubility limit of alkali tungstate within the molten glass, and therefore of articles cast from such melts. Conventionally, when a tungsten, molybdenum, or mixed tungsten-molybdenum melt was even slightly peralkaline (e.g., $R_2O$ minus $Al_2O_3$=0.25 mol % or greater), the melted borosilicate glass formed both a glass and a dense liquid second phase. While the concentration of the alkali tungstate second phase could be minimized by thorough mixing, melting at a high temperature, and employing a small batch size (~1000 g), it could not be fully eliminated leading to formation of a deleterious second crystalline phase. It is believed that the formation of this alkali tungstate phase occurs in the initial stages of the melt, where tungsten oxide and the optional molybdenum oxide reacts with "free" or "unbound" alkali carbonates. Due to the high density of alkali tungstate and alkali molybdate relative to the borosilicate glass that is formed, it rapidly segregates and/or stratifies, pooling at the bottom of the crucible and does not rapidly solubilize in the glass due to the significant difference in density. As the $R_2O$ constituents may provide beneficial properties to the glass composition, simply decreasing the presence of the $R_2O$ constituents within the melt may not be desirable. As the tungsten and/or molybdenum segregates, it is difficult to saturate the glass with it, and accordingly, it is difficult to get it to crystallize from the glass and form the precipitates as described herein.

It has been discovered that a homogenous single phase W-, single phase Mo- or mixed W- and Mo-containing peralkaline melt may be obtained through the use of "bound" alkalis. For purposes of this disclosure, "bound" alkalis are alkali elements which are bonded to oxygen ions which are bound to aluminum, boron, and/or silicon atoms, while "free" or "unbound" alkalis are alkali carbonates, nitrates, or sulfates, which are not bound to an oxygen ion already bound to silicon, boron, or aluminum atoms. Exemplary bound alkalis may include feldspar, nepheline, borax, spodumene, other sodium or potassium feldspars, alkali-aluminum-silicates and/or other oxide compositions containing an alkali and one or more aluminum and/or silicon atoms. By introducing the alkali in the bound form, the alkalis may not react with the W and/or Mo present in the melt to form the dense alkali tungstate and/or alkali molybdate liquid. Moreover, this change in batch material may allow the melting of strongly peralkaline compositions (e.g., $R_2O$—$Al_2O_3$=2.0 mol % or more) without the formation of an alkali tungstate and/or alkali molybdate second phase. This has also allowed the melt temperature and mixing method to be varied and still produce a single-phase homogenous glass. It will be understood that as the alkali tungstate phase and the borosilicate glass are not completely immiscible, prolonged stirring may also allow mixing of the two phases to cast a single phase article.

Once the glass melt is cast and solidified into the glass state article, the article 10 may be annealed, heat treated or otherwise thermally processed to form or modify a crystalline phase within the article 10. Accordingly, the article 10 may be transformed from the glass state to the glass-ceramic state. The crystalline phase of the glass-ceramic state may take a variety of morphologies. According to various examples, the crystalline phase is formed as a plurality of precipitates, such as homogenously distributed precipitates, within the heat treated region of the article 10. As such, the precipitates may have a generally crystalline structure. The glass-ceramic state may include two or more crystalline phases.

As used herein, "a crystalline phase" refers to an inorganic material within the articles of the disclosure that is a solid composed of atoms, ions or molecules arranged in a pattern that is periodic in three dimensions. Further, "a crystalline phase" as referenced in this disclosure, unless expressly noted otherwise, is determined to be present using the following method. First, powder x-ray diffraction ("XRD") is employed to detect the presence of crystalline precipitates. Second, Raman spectroscopy ("Raman") is employed to detect the presence of crystalline precipitates in the event that XRD is unsuccessful (e.g., due to size, quantity and/or chemistry of the precipitates). Optionally, transmission electron microscopy ("TEM") is employed to visually confirm or otherwise substantiate the determination of crystalline precipitates obtained through the XRD and/or Raman techniques. In certain circumstances, the quantity and/or size of the precipitates may be low enough that visual confirmation of the precipitates proves particularly difficult. As such, the larger sample size of XRD and Raman may be advantageous in sampling a greater quantity of material to determine the presence of the precipitates.

The crystalline precipitates may have a generally rod-like or needle-like morphology. The precipitates may have a longest length dimension of from 1 nm to 500 nm, or from 1 nm to 400 nm, or from 1 nm to 300 nm, or from 1 nm to 250 nm, or from 1 nm to 200 nm, or from 1 nm to 100 nm, or from 1 nm to 75 nm, or from 1 nm to 50 nm, or from 5 nm to 50 nm, or from 1 nm to 25 nm, or from 1 nm to 20 nm, or from 1 nm to 10 nm. The size of the precipitates may be measured using Electron Microscopy. For purposes of this disclosure, the term "Electron Microscopy" means visually measuring the longest length of the precipitates first by using a scanning electron microscope, and if unable to resolve the precipitates, next using a transmission electron microscope. As the crystalline precipitates may generally have a rod-like or needle-like morphology, the precipitates may have a width of from 5 nm to 50 nm, or from 2 nm to 30 nm, or from 2 nm to 10 nm, or from 2 nm to 7 nm. It will be understood that the size and/or morphology of the precipitates may be uniform, substantially uniform or may vary.

The relatively small size of the precipitates may be advantageous in reducing the amount of light scattered by the precipitates leading to high optical clarity of the article 10 when in the glass-ceramic state. As will be explained in greater detail below, the size and/or quantity of the precipitates may be varied across the article 10 such that different portions of the article 10 may have different optical properties. For example, portions of the article 10 where the precipitates are present may lead to changes in the absorbance, color, reflectance, transmission of light, and/or refractive index, as compared to portions of the article 10 where different precipitates (e.g., size and/or quantity) and/or no precipitates are present.

The precipitates may be composed of tungsten oxide, molybdenum oxide or tungsten oxide and molybdenum oxide plus iron and/or manganese. The crystalline phase includes an oxide, from 0.1 mol % to 100 mol % of the crystalline phase, of at least one of: (i) W+Fe and/or Mn; (ii) Mo+Fe and/or Mn; (iii) Mo+W+Fe and/or Mn; and (iv) any of (i)-(iii) and an alkali metal cation. Without being bound by theory, it is believed that during thermal processing (e.g., heat treating) of the article 10, the tungsten and/or the molybdenum cations, along with the iron and/or manganese cations, can agglomerate to form crystalline precipitates thereby transforming the glass state into the glass-ceramic state. The molybdenum and/or tungsten, along with the iron and/or manganese, present in the precipitates may be reduced, or partially reduced. For example, the molybdenum and/or tungsten within the precipitates may have an oxidation state of between 0 and +6, or from +4 and +6, or from +5 and +6. According to various examples, the molybdenum and/or tungsten may have a +6 oxidation state. For example, the precipitates formed by these glass-ceramics may have the general chemical structure of $WO_3$ and/or $MoO_3$. Other precipitates formed by these glass-ceramics may be known as non-stoichiometric tungsten suboxides, non-stoichiometric molybdenum suboxides, "molybdenum bronzes" and/or "tungsten bronzes." One or more of the above-noted alkali metals, Fe and/or Mn, and/or other dopants may be present within the precipitates. Tungsten, molybdenum and/or mixed tungsten molybdenum bronzes are a group of non-stoichiometric tungsten and/or molybdenum sub-oxides that takes the general chemical form of $M_xWO_3$ or $MxMoO_3$, where M=Fe, Mn, H, Li, Na, K, Rb, Cs, Ca, Sr, Ba, Zn, Ag, Au, Cu, Sn, Cd, In, Tl, Pb, Bi, Th, La, Pr, Nd, Sm, Eu, Gd, Dy, Ho, Er, Tm, Yb, Lu, and U, and where $0<x<1$. The structures $M_xWO_3$ and $MxMoO_3$ are considered to be a solid state defect structure in which holes (vacancies and/or interstices) in a reduced $WO_3$, $MoO_3$, $WO_4$ and/or $MoO_4$ network are randomly occupied by M atoms, which are dissociated into $M^+$ or $M^{2+}$ cations and free electrons. Depending on the concentration of "M," the material properties can range from metallic to semi-conducting, thereby allowing a variety of optical absorption and electronic properties to be tuned. Further, the structure of these bronzes is considered to be a solid state defect structure in which M cations intercalate into holes or channels of the oxide host and dissociate into M' or $M^{2+}$ cations and free electrons. In turn, as x is varied, these materials can exist as a broad sequence of solid phases with definite and wide ranges of homogeneity. As another example, the crystalline precipitates of the article 10 can comprise an oxide of at least one of the chemical form $MWO_4$ and/or $MMoO_4$, in which M is $Fe^{2+}$ or $Mn^{2+}$. These crystalline phases known as tungstates (or molybdates) derive their name from the simplest tungsten and molybdenum anions $WO_4^2$ and $MoO_4^{2-}$, which can be charged stabilized 2+ cations such as $Fe^{2+}$ and/or $Mn^{2+}$ to form stable crystalline species. Naturally occurring iron and manganese tungstates are known colloquially as the mineral Ferberite ($FeWO_4$) and Hubnerite ($MnWO_4$). There are also naturally occurring iron and manganese molybdates A portion, a majority, substantially all or all of the article 10 may be thermally processed to form the precipitates. Thermal processing techniques may include, but are not limited to, a furnace (e.g., a heat treating furnace), a laser and/or other techniques of locally and/or bulk heating of the article 10. While undergoing thermal processing, the crystalline precipitates internally nucleate within the article 10 in a homogenous manner where the article 10 is thermally processed to form the glass-ceramic state. As such, in some examples, the article 10 may include both glass and glass-ceramic portions. In examples where the article 10 is thermally processed in bulk (e.g., the whole article 10 is placed in a furnace), the precipitates may homogenously form throughout the article 10. In other words, the precipitates may exist from a surface of the article 10 throughout the bulk of the article 10 (i.e., greater than 10 µm from the surface). In examples where the article 10 is thermally processed locally (e.g., via a laser), the precipitates may only be present where the thermal processing reaches a sufficient temperature (e.g., at the surface and into the bulk of the article 10 proximate the heat source). It will be understood that the article 10 may undergo more than one thermal processing to produce the precipitates. Additionally or alternatively, thermal processing may be utilized to remove and/or alter precipitates which have already been formed (e.g., as a result of previous thermal processing). For example, thermal processing may result in the decomposition of precipitates.

According to various examples, the article 10 may be black in color. For purposes of this disclosure, the term "black" or "pure black" means a material which is capable of exhibiting an absorbance of at least 2 OD/mm across the visible spectrum (i.e., 400 nm to 700 nm). The tungsten and molybdenum bronzes, as containing iron and/or manganese, of the disclosure can also exhibit strong UV and VIS absorption. Without being bound by theory, the mechanistic origin of the optical absorbance of examples of the glass-ceramics of the disclosure can arise due to the formation of solid solutions of various crystalline species from the wolframite solid solution family. Wolframite is an iron manganese tungstate solid solution mineral of the form (Fe,Mn)$WO_4$ that is the intermediate between the pure iron endmember Ferberite ($FeWO_4$) and the pure manganese end member Hübernerite ($MnWO_4$).

The crystallites in the pure black absorptive glass-ceramics of the disclosure comprise oxides of iron plus tungsten, iron plus molybdenum, iron plus tungsten plus molybdenum (in the case of a mixed tungsten/molybdenum glass ceramic), or any of the aforementioned combinations plus at least one of the following dopants that could either reside in the glass or intercalate into the crystal: H, S, Cl, Ti, V, Cr, Co, Ni, Cu, Ga, Se, Br, Zr, Nb, Ru, Rh, Pd, Ag, Cd, In, Sb, Te, I, La, Ce, Pr, Nd, Sm, Eu, Gd, Tb, Dy, Ho, Er, Tm, Yb, Lu, Ta, Os, Ir, Pt, Au, Tl, Pb, Bi, and U. In some embodiments of these glass-ceramics, the at least one dopant is present in the glass-ceramic from 0 mol % to 0.5 mol %. Similarly, the crystallites in the glass-ceramics of the disclosure that give rise to optical absorbance profiles analogous to cadmium and selenium-containing filter glasses (e.g., for optical filter applications) comprise oxides of manganese plus tungsten, manganese plus molybdenum, manganese plus tungsten plus molybdenum (in the case of a mixed tungsten/molybdenum glass ceramic), or any of the aforementioned combinations plus at least one of the following dopants that could either reside in the glass or intercalate into the crystal: H, S, Cl, Ti, V, Cr, Co, Ni, Cu, Ga, Se, Br, Zr, Nb, Ru, Rh, Pd, Ag, Cd, In, Sb, Te, I, La, Ce, Pr, Nd, Sm, Eu, Gd, Tb, Dy, Ho, Er, Tm, Yb, Lu, Ta, Os, Ir, Pt, Au, Tl, Pb, Bi, and U. In some embodiments of these glass-ceramics, the at least one dopant is present in the glass-ceramic from 0 mol % to 0.5 mol %. Further, the amounts of these dopant(s) can be used to further modify the optical absorbance of the glass-ceramic (e.g., to obtain a sharp cutoff wavelength), e.g., as necessary based on the intended optics-related application for the article employing the glass-ceramic.

The thermal processing of the article 10 to develop the precipitates, generate the black color and/or generate the absorbance profile suitable for an optics-related application (e.g., with a sharp cutoff wavelength) may be accomplished in a single step or through multiple steps. For example, the generation of a pure black color or a particular optical absorbance profile exhibited by the article 10 (e.g., which starts with the formation of a $WO_3$ and/or $MoO_3$ precipitates followed by the partial reduction of that crystallite with the simultaneous intercalation of a dopant species (e.g., alkali metal cations into the crystal)) can be completed in a single heat treatment immediately after the article 10 is formed, or at a later point. For example, the article 10 may be cast and then processed into a final form (e.g., lens blanks or other optical or aesthetic elements) and then annealed at a temperature just below where color is generated (e.g., intercalation of the alkali metal ions into the precipitates). This annealing may start the clustering of $WO_3$ and/or $MoO_3$, and then a secondary thermal processing may occur at an elevated temperature to allow further crystallization and the partial reduction of the $WO_3$ and/or $MoO_3$ crystals and intercalation of alkali metal ions and/or other species to generate color. It may also enable the chemical formation of iron- and/or manganese-doped tungstates, molybdates, and/or mixed W+Mo 'tungsto-molybdates'.

The thermal processing of the article 10, which generates the precipitates and/or intercalates the dopants into the precipitates, may occur under a variety of times and temperatures. It will be understood that thermal processing of the article 10 is carried out in air unless otherwise noted. In examples where the article 10 is thermally processed in a furnace, the article 10 may be placed in the furnace at room temperature with a controlled ramping in temperature and/or may be "plunged" into a furnace already at an elevated temperature. The thermal processing may occur at a temperature of from 400° C. to 1000° C. For example, the secondary thermal processing (e.g., post-annealing) may take place at a temperature of 400° C., or 425° C., or 450° C., or 475° C., or 500° C., or 505° C., or 510° C., or 515 C, or 520° C., or 525° C., or 530° C., or 535° C., or 540° C., or 545° C., or 550° C., or 555° C., or 560° C., or 565° C., or 570° C., or 575° C., or 580° C., or 585° C., or 590° C., or 595° C., or 600° C., or 605° C., or 610° C., or 615° C., or 620° C., or 625° C., or 630° C., or 635° C., or 640° C., or 645° C., or 650° C., or 655° C., or 660° C., or 665° C., or 670° C., or 675° C., or 680° C., or 685° C., or 690° C., or 695° C., or 700° C. In preferred embodiments, the secondary thermal processing can take place from 475° C. to 600° C., or from 500° C. to 575° C., which is substantially lower in temperature than the thermal processing employed in conventional glass-ceramic compositions (e.g., containing Fe and/or Mn dopants but no molybdenum or tungsten) that may be capable of achieving a pure black color. It will also be understood that any and all values and ranges between the temperatures provided for the secondary thermal processing are contemplated.

The secondary thermal processing (e.g., post-annealing) may be carried out for a time period of from 1 second to 24 hours. For example, the thermal processing may be carried out for 1 second, or 30 seconds, or 45 seconds, or 1 minute, or 2 minutes, or 5 minutes, or 10 minutes, or 15 minutes, or 20 minutes, or 25 minutes, or 30 minutes, or 35 minutes, or 40 minutes, or 45 minutes, or 50 minutes, or 55 minutes, or 60 minutes, or 65 minutes, or 70 minutes, or 75 minutes, or 80 minutes, or 85 minutes, or 90 minutes, or 95 minutes, or 100 minutes, or 105 minutes, or 110 minutes, or 115 minutes, or 120 minutes, or 125 minutes, or 130 minutes, or 135 minutes, or 140 minutes, or 145 minutes, or 150 minutes, or 155 minutes, or 160 minutes, or 165 minutes, or 170 minutes, or 175 minutes, or 180 minutes, or 185 minutes, or 190 minutes, or 195 minutes, or 200 minutes, or 205 minutes, or 210 minutes, or 215 minutes, or 220 minutes, or 225 minutes, or 230 minutes, or 235 minutes, or 240 minutes, or 245 minutes, or 250 minutes, or 255 minutes, or 300 minutes, or 350 minutes, or 400 minutes, or 450 minutes, or 500 minutes. It will be understood that thermal processing may be carried out for significantly longer times upwards of 6 hours or more, 7 hours or more, 8 hours or more, 9 hours or more, 10 hours or more, 11 hours or more, 12 hours or more, 13 hours or more, 14 hours or more or 15 hours or more. In preferred embodiments, the secondary thermal processing can be conducted from 15 minutes to 120 minutes, or from 30 minutes to 105 minutes, which is a substantially shorter duration than the duration of thermal processing employed in conventional glass-ceramic compositions that may be capable of achieving a pure black color. It will also be understood that any and all values and ranges between the durations provided for the secondary thermal processing are contemplated.

In some examples, the article 10 may then be cooled to a lower temperature at a rate of 0.1° C. per minute, or 1° C. per minute, or 2° C. per minute, or 3° C. per minute, or 4° C. per minute, or 5° C. per minute, or 6° C. per minute, or 7° C. per minute, or 8° C. per minute, or 9° C. per minute or 10° C. per minute. The lower temperature may be from room temperature (e.g., 23° C.) to 500° C. For example, the lower temperature may be 23° C., 50° C., 75° C., 100° C., 125° C., 150° C., 175° C., 200° C., 225° C., 250° C., 275° C., 300° C., 325° C., 350° C., 375° C., 400° C., 425° C., 450° C., 470° C., or 500° C. It will be understood that the article 10 may undergo a multistage thermal processing using one or more of the above noted times, temperatures and cooling rates. It will also be understood that any and all values and ranges between the cooling rates and lower temperatures provided for the secondary thermal processing are contemplated.

As explained above, additionally or alternatively to the use of a furnace, the article 10 may be thermally processed through the use of a laser and/or other localized heat source. Such an example may be advantageous in producing a localized darker or lighter region within the glass-ceramic. The laser and/or localized heat source may supply sufficient thermal energy to create the precipitates and/or intercalate one or more alkali metal ions into the precipitates to generate localized color and/or differences in absorbance. The laser and/or other heat source may be rastered or guided across the article 10 to preferentially create varied optical properties across the article 10. The intensity and/or speed of the laser and/or localized heat source may be adjusted as it is moved across the article 10 such that various portions of the article 10 exhibit different levels of dark shading. Such features may be advantageous in creating indicia, symbols, text, numbers and/or pictures in the article 10.

The article 10 may exhibit an absorbance over certain wavelength bands of electromagnetic radiation. The absorbance may be expressed in terms of optical density per millimeter (OD/mm). As understood by those in the art, optical density is the log of the ratio of light intensity exiting the article 10 to light intensity entering the article 10. Absorbance data may be collected using a UV/VIS spectrophotometer in conformance with the measurement rules according to ISO 15368. Over an ultraviolet (UV) wavelength range of from 300 nm to 400 nm, the article 10 may have an average absorbance from 0.1 OD/mm to 20 OD/mm, or from 1 OD/mm to 15 OD/mm, or from 5 OD/mm to 15 OD/mm, or from 7 OD/mm to 15 OD/mm. For example, the article 10 may have an average absorbance over a wavelength of from 300 nm to 400 nm of 0.5 OD/mm or greater, or 1.0 OD/mm or greater, or 1.5 OD/mm or greater, or 2.0 OD/mm or greater, or 2.5 OD/mm or greater, or 3.0 OD/mm or greater, or 3.5 OD/mm or greater, or 4.0 OD/mm or greater, or 4.5 OD/mm or greater, or 5.0 OD/mm or greater, or 5.5 OD/mm or greater, or 6.0 OD/mm or greater, or 6.5 OD/mm or greater, or 7.0 OD/mm or greater, or 7.5 OD/mm or greater, or 8.0 OD/mm or greater, or 8.5 OD/mm or greater, or 9.0 OD/mm or greater, or 9.5 OD/mm or greater, or 10.0 OD/mm or greater. It will be understood that any and all values and ranges between the average absorbance values from 300 nm to 400 nm listed above are contemplated.

Over a visible wavelength range of from 400 nm to 700 nm, the article 10 may have an average absorbance of 0.1 OD/mm to 20 OD/mm, or from 0.1 OD/mm to 15 OD/mm, or from 0.1 OD/mm to 12 OD/mm, or from 0.2 OD/mm to 12 OD/mm, or from 0.2 OD/mm to 10 OD/mm, or from 5 OD/mm to 10 OD/mm, or from 7 OD/mm to 10 OD/mm. For example, the article 10 may have an average absorbance over a wavelength of from 400 nm to 700 nm of at least 0.1 OD/mm, 0.2 OD/mm, 0.3 OD/mm, 0.4 OD/mm, 0.5 OD/mm, 1 OD/mm, 1.5 OD/mm, 2 OD/mm, 2.5 OD/mm, 3 OD/mm, 3.5 OD/mm, 4 OD/mm, 4.5 OD/mm, 5 OD/mm, 5.5 OD/mm, 6 OD/mm, 7 OD/mm, 8 OD/mm, 9 OD/mm, 10 OD/mm, 11 OD/mm, 12 OD/mm, 15 OD/mm, or 20 OD/mm. It will be understood that any and all values and ranges between the average absorbance values from 400 nm to 700 nm listed above are contemplated.

Over a wavelength range of from 700 nm to 1500 nm, the article 10 may have an average absorbance of 0.05 OD/mm to 10 OD/mm, or from 0.05 OD/mm to 5 OD/mm, or from 0.1 OD/mm to 5 OD/mm, or from 0.1 OD/mm to 4 OD/mm, or from 0.5 OD/mm to 4 OD/mm, or from 1 OD/mm to 4 OD/mm. For example, over a wavelength range of from 700 nm to 1500 nm, the article 10 may have an absorbance of 0.05 OD/mm, 0.1 OD/mm, 0.2 OD/mm, 0.3 OD/mm, 0.4 OD/mm, 0.6 OD/mm, 0.8 OD/mm, 1.0 OD/mm, 1.2 OD/mm, 1.4 OD/mm, 1.6 OD/mm, 1.8 OD/mm, 2.0 OD/mm, 2.2 OD/mm, 2.4 OD/mm, 2.6 OD/mm, 2.8 OD/mm, 3.0 OD/mm, 3.2 OD/mm, 3.4 OD/mm, 3.6 OD/mm, 3.8 OD/mm, 4.0 OD/mm, 5.0 OD/mm, 7.5 OD/mm, or 10 OD/mm. It will be understood that any and all values and ranges between the average absorbance values from 700 nm to 1500 nm listed above are contemplated.

Over a wavelength range of from 700 nm to 2000 nm, the article 10 may have an average absorbance of 0.05 OD/mm to 10 OD/mm, or from 0.05 OD/mm to 5 OD/mm, or from 0.1 OD/mm to 5 OD/mm, or from 0.1 OD/mm to 4 OD/mm, or from 0.5 OD/mm to 3 OD/mm, or from 1 OD/mm to 3 OD/mm. For example, over a wavelength range of from 700 nm to 2000 nm, the article 10 may have an absorbance of 0.05 OD/mm, 0.1 OD/mm, 0.2 OD/mm, 0.3 OD/mm, 0.4 OD/mm, 0.6 OD/mm, 0.8 OD/mm, 1.0 OD/mm, 1.2 OD/mm, 1.4 OD/mm, 1.6 OD/mm, 1.8 OD/mm, 2.0 OD/mm, 2.2 OD/mm, 2.4 OD/mm, 2.6 OD/mm, 2.8 OD/mm, 3.0 OD/mm, 3.2 OD/mm, 3.4 OD/mm, 3.6 OD/mm, 3.8 OD/mm, 4.0 OD/mm, 5.0 OD/mm, 7.5 OD/mm, or 10 OD/mm. It will be understood that any and all values and ranges between the average absorbance values from 700 nm to 2000 nm listed above are contemplated.

The article 10 may exhibit differing transmittances over different wavelength bands of electromagnetic radiation. The transmittance may be expressed in a percent transmittance. Transmittance data may be collected using a UV/VIS spectrophotometer on a sample having a 0.5 mm thickness in conformance with the measurement rules according to ISO 15368, unless otherwise noted in the disclosure. Over a UV wavelength range of from 300 nm to 400 nm, the article 10 may have transmittance of 0% to 50%, or from 0.01 to 30%, or from 0.01% to 0.91%. For example, the article 10 may have a transmittance over a wavelength of from 300 nm to 400 nm of 0.5%, or 5%, or 10%, or 15%, or 20%, or 25%, or 30%, or 35%, or 40% or 45%. It will be understood that any and all values and ranges between the transmittance values listed above are contemplated.

The article 10 may have a transmittance over a visible wavelength range of from 400 nm to 700 nm of 0% to 95%, or from 0% to 88%, or from 0% to 82%, or from 0% to 70%, or from 0% to 60%, or from 0% to 50%, or from 0% to 40%, or from 0% to 30%, or from 0% to 20%, or from 0% to 10%, or from 5% to 50%, or from 10% to 70%. In some examples having a thickness of 1.9 mm, the article 10 exhibits an average transmittance of at least 7%, at least 10%, at least 15%, or at least 20%, within a wavelength range from 400 nm to 700 nm. It will be understood that any and all values and ranges between or above the transmittance values listed above are contemplated.

The article 10 may have a transmittance over an infrared (IR) or near-infrared (NIR) wavelength range of from 700 nm to 3000 nm of 0% to 95%, or from 0% to 88%, or from 0% to 82%, or from 0% to 70%, or from 0% to 60%, or from 0% to 50%, or from 0% to 40%, or from 0% to 30%, or from 0% to 20%, or from 0% to 10%, or from 5% to 50%, or from 10% to 70%. According to some examples, the article 10 may exhibit a transmittance of at least 10%, 20%, 30%, 40%, 50%, 60%, 70%, 80%, or 90% in the IR/NIR wavelength range from 700 nm to 3000 nm. In some examples having a thickness of 0.5 mm, the article 10 exhibits an average transmittance of at least 50%, at least 60%, at least 70%, at least 80%, or at least 90%, within a wavelength range from 700 nm to 3000 nm. It will be understood that any and all values and ranges between or above the transmittance values in the wavelength range from 700 nm to 3000 nm listed above are contemplated.

As disclosed above, glass-ceramic, according to some exemplary embodiments, has transmittance of about 5%/mm or greater over at least one 50 nm-wide wavelength band of light in a range from about 400 nm to about 700 nm. However, in other embodiments, the glass-ceramics have lower transmittance, such as those that are opaque. According to at least some such embodiments, the glass-ceramics strongly absorb, but do not scatter, light and have low haze. According to various such embodiments, the glass-ceramics have an average absorbance of at least 5 OD/mm for at least some light with 300 nm to 400 nm wavelengths (e.g., >90%), or at least 7 OD/mm for light over the same wavelengths. These glass-ceramics can also exhibit a haze of less than 10%. According to various embodiments, the glass-ceramics of the disclosure have an average absorbance of at least 2 OD/mm for at least some of light with 400 nm to 700 nm wavelengths (e.g., >90%), or at least 5 OD/mm for light over the same wavelengths. The article 10, according to these embodiments, can also exhibit a haze of less than 10%. According to various such embodiments, the glass-ceramics also exhibit an absorbance of at least 0.1 OD/mm for at least some of light with 700 nm to 1500 nm wavelengths (e.g., >90%) and some light with 700 nm to 2000 nm wavelengths (e.g., >90%), respectively, or at least 1 OD/mm for some light over the same wavelengths. It should also be understood that optical density is calculated from measurements of optical absorbance, which is made with a spectrophotometer; and haze is measured by a haze meter wide-angle scattering test.

The article 10 may also exhibit a scattering of from 0.1% to 25% over a visible wavelength band of 400 nm to 700 nm at a thickness of 1 mm. For example, the article 10 may exhibit a scattering of 25% or less, 24% or less, 23% or less, 22% or less, 21% or less, 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less or 1% or less. Scattering data is collected in conformance with ISO 13696 (2002) Optics and Optical Instruments-Test methods for radiation scattered by optical components.

In some aspects of the disclosure, the article 10 may exhibit a sharp cutoff wavelength in a wavelength band from 320 nm to 525 nm, from 320 nm to 800 nm, or from 350 nm to 800 nm.

According to various examples, the article 10 may exhibit a low haze. For example, the article may exhibit a haze of 20% or less, or 15% or less, or 12% or less, or 11% or less, or 10.5% or less, or 10% or less, or 9.5% or less, or 9% or less, or 8.5% or less, or 8% or less, or 7.5% or less, or 7% or less, or 6.5% or less, or 6% or less, or 5.5% or less, or 5% or less, or 4.5% or less, or 4% or less, or 3.5% or less, or 3% or less, or 2.5% or less, or 2% or less, or 1.5% or less, or 1% or less, or 0.5% or less, or 0.4% or less, or 0.3% or less, or 0.2% or less, or 0.1% or less or any and all values and ranges therebetween. The haze of the article is measured on a 1 mm thick sample and in accordance with the procedure outlined above in connection with haze measurement. According to various examples, the haze of the article may be lower than conventional glass-ceramics, including conventional glass-ceramics capable of achieving a black hue. Further, the haze of the article may be due to the low quantity or absence of large crystallites (e.g., <100 nm, or <60 nm, or <40 nm) which tend to scatter light.

Various examples of the present disclosure may offer a variety of properties and advantages. It will be understood that although certain properties and advantages may be disclosed in connection with certain compositions, various properties and advantages disclosed may equally be applicable to other compositions.

First, glass-ceramic compositions of the article 10 can be characterized as a pure black material at relatively low thicknesses (e.g., from 0.5 mm to 0.7 mm), which can be formed into a chemically strengthened, scratch-resistant sheet. Such sheets are suitable for use as components, including housings and enclosures, of portable computing devices.

Second, the pure black glass-ceramic compositions of the article 10 can be produced with low temperature (e.g., from 500° C. to 575° C.) and low duration (e.g., from 30 minutes to 105 minutes) heat treatment cycles, which are significantly lower in temperature and shorter in duration than the heat treatment steps to produce comparable black colors in conventional glass-ceramic compositions. Accordingly, the glass-ceramic compositions of the disclosure can be produced with significantly lower production costs than conventional glass-ceramics with similar properties. Another benefit of the low temperature heat treatment cycles of the glass-ceramic compositions of the disclosure is that they are relatively close in temperature to the typical annealing cycles that preceded these heat treatment cycles. As such, the glass-ceramic compositions of the disclosure can be heat-treated with a low risk of sheet warp or surface deformation during the heat treatment cycle employed to develop the crystalline precipitates in the glass. In addition, some of the glass-ceramic compositions of the disclosure for use in article 10 can be tailored to spontaneously crystallize upon melting and annealing to form a pure black without the need for an additional heat treatment step.

Third, the compositions of the article 10 can have a sufficiently high liquidus viscosity such that the article 10 may be capable of fusion forming or three-dimensional (3D) forming processes. With respect to ion-exchanging, ion-exchanging may provide a compressive stress at the selected depth 30 which may increase the durability and/or scratch resistance of the article 10. Further, the glass-ceramic compositions of the disclosure are not susceptible to the color alteration- or haze-related problems associated with 3D forming processes employed with other conventional glass-ceramic compositions. Notably, embodiments of the glass-ceramics of the disclosure do not bleach upon re-heating (after the heat treatment cycle); consequently, the glass-ceramics of the disclosure do not require post-processing upon being formed into a desired shape with a 3D forming process.

Fourth, the Fe-containing glass-ceramic compositions of the disclosure can be characterized with a low propensity for radiation trapping during melting (e.g., IR-influenced radiation trapping). In materials susceptible to radiation trapping, viscosity levels can significantly fluctuate during processing leading to process instabilities, particularly for fusion draw processing of the material in sheet form. As such, these glass-ceramic compositions are particularly suitable for conventional melting and fusion draw processing, particularly as compared to other conventional glass-ceramic compositions without tungsten and/or molybdenum oxides.

Fifth, Mn-containing glass-ceramic compositions of the disclosure, and the articles containing them, offer various advantages over conventional glass, glass-ceramic and ceramic materials employed in optics-related applications, including advantages over CdSe glasses. As noted earlier, examples of the glass-ceramic compositions of the disclosure are substantially free of Cd and Se, while offering sharp, visible extinctions that are analogous to orange-colored, conventional CdSe optical filter glasses. Further, the glass-ceramic materials of the disclosure are formulated with lower cost materials in comparison to conventional alternatives to CdSe glass that employ indium, gallium and/or other high-cost metals and constituents, some of which are highly regulated under RCRA. In addition, these glass-ceramic materials can be produced with conventional melt quench processes, unlike other conventional CdSe glass alternatives, such as indium and gallium-containing semiconductor-doped glasses that require additional semiconductor synthesis and milling steps.

Sixth, the Mn-containing glass-ceramic material can be characterized by a cutoff wavelength that is tunable through selection of heat treatment temperature and time conditions. The glass-ceramic materials of the disclosure also offer visible extinctions that are sharper in comparison to other non-cadmium-containing semiconductor-doped glasses, a conventional alternative to a CdSe glass.

EXAMPLES

The following examples represent certain non-limiting examples of the composition of the articles of the disclosure.

Example 1

Referring now to Table 2, a list of exemplary iron- and manganese-doped tungsten and molybdenum oxide glass-ceramics is provided. In particular, Exs. 1-1 to 1-8 are iron-doped, tungsten oxide glass-ceramic compositions, Exs. 1-9 to 1-12 are iron-doped molybdenum oxide glass-ceramic compositions, Exs. 1-13 to 1-18 are manganese-doped tungsten oxide glass-ceramic compositions, and Exs. 1-19 and 1-20 are manganese-doped molybdenum oxide glass-ceramic compositions, all suitable for use in an article (e.g., the article 10) of the disclosure. Of the iron-doped compositions, Exs. 1-1 to 1-5, 1-9 and 1-10 include fluorine, and Exs. 1-6, to 1-8, 1-11 and 1-12 are fluorine free. Of the manganese-doped compositions, Exs. 1-13 to 1-15 and 1-19 include fluorine, and Exs. 1-16 to 1-18 and Ex. 1-20 are fluorine free. Of the iron-doped compositions, Exs. 6-8, 11 and 12 include phosphorous. Of the manganese-doped compositions, Exs. 16-18, and 20 also include phosphorous. Further, all of these exemplary compositions are provided in as-batched mol %.

TABLE 2

Fe- and Mn-doped W and Mo bronze ceramic compositions (mol %)

| Ex. | 1-1 | 1-2 | 1-3 | 1-4 | 1-5 | 1-6 | 1-7 | 1-8 | 1-9 | 1-10 |
|---|---|---|---|---|---|---|---|---|---|---|
| $SiO_2$ | 55.208 | 55.077 | 54.981 | 54.929 | 54.877 | 64.744 | 64.121 | 63.509 | 55.269 | 55.086 |
| $Al_2O_3$ | 10.811 | 10.785 | 10.767 | 10.756 | 10.746 | 13.660 | 13.528 | 13.399 | 10.823 | 10.787 |
| $B_2O_3$ | 12.624 | 12.594 | 12.572 | 12.561 | 12.549 | 4.871 | 4.824 | 4.778 | 12.638 | 12.596 |
| $Li_2O$ | 5.410 | 5.397 | 5.387 | 5.382 | 5.377 | 8.166 | 8.087 | 8.010 | 5.416 | 5.398 |
| $Na_2O$ | 6.607 | 6.592 | 6.580 | 6.574 | 6.568 | 1.923 | 1.904 | 1.886 | 6.615 | 6.593 |
| $K_2O$ | 0.023 | 0.023 | 0.023 | 0.023 | 0.023 | 0.035 | 0.034 | 0.034 | 0.023 | 0.023 |
| MgO | 0.016 | 0.016 | 0.000 | 0.000 | 0.000 | 0.000 | 0.000 | 0.000 | 0.000 | 0.000 |
| CaO | 0.190 | 0.189 | 0.189 | 0.189 | 0.189 | 0.194 | 0.193 | 0.191 | 0.190 | 0.189 |
| $SnO_2$ | 0.142 | 0.142 | 0.142 | 0.142 | 0.141 | 0.146 | 0.144 | 0.143 | 0.143 | 0.142 |
| $WO_3$ | 3.085 | 3.078 | 3.781 | 3.778 | 3.774 | 3.889 | 4.814 | 5.722 | 0.000 | 0.000 |
| $MoO_3$ | 0.000 | 0.000 | 0.000 | 0.000 | 0.000 | 0.000 | 0.000 | 0.000 | 3.088 | 3.078 |
| $P_2O_5$ | 0.000 | 0.000 | 0.000 | 0.000 | 0.000 | 1.886 | 1.868 | 1.850 | 0.000 | 0.000 |
| $Fe_2O_3$ | 0.475 | 0.710 | 0.189 | 0.283 | 0.377 | 0.486 | 0.481 | 0.477 | 0.380 | 0.710 |
| $MnO_2$ | 0.000 | 0.000 | 0.000 | 0.000 | 0.000 | 0.000 | 0.000 | 0.000 | 0.000 | 0.000 |
| $F^-$ | 5.410 | 5.397 | 5.388 | 5.383 | 5.378 | 0.000 | 0.000 | 0.000 | 5.416 | 5.398 |
| Total | 100.00 | 100.00 | 100.00 | 100.00 | 100.00 | 100.00 | 100.00 | 100.00 | 100.00 | 100.00 |

| Ex. | 1-11 | 1-12 | 1-13 | 1-14 | 1-15 | 1-16 | 1-17 | 1-18 | 1-19 | 1-20 |
|---|---|---|---|---|---|---|---|---|---|---|
| $SiO_2$ | 65.380 | 65.061 | 55.215 | 54.953 | 54.567 | 64.430 | 63.207 | 62.908 | 54.954 | 64.745 |
| $Al_2O_3$ | 13.794 | 13.726 | 10.812 | 10.761 | 10.686 | 13.593 | 13.335 | 13.272 | 10.761 | 13.660 |
| $B_2O_3$ | 4.919 | 4.895 | 12.626 | 12.566 | 12.478 | 4.847 | 4.755 | 4.733 | 12.566 | 4.871 |
| $Li_2O$ | 8.246 | 8.206 | 5.410 | 5.385 | 5.347 | 8.126 | 7.972 | 7.934 | 5.385 | 8.166 |
| $Na_2O$ | 1.942 | 1.932 | 6.608 | 6.577 | 6.531 | 1.914 | 1.877 | 1.868 | 6.577 | 1.923 |
| $K_2O$ | 0.035 | 0.035 | 0.023 | 0.023 | 0.023 | 0.035 | 0.034 | 0.034 | 0.023 | 0.035 |
| MgO | 0.000 | 0.000 | 0.000 | 0.000 | 0.000 | 0.000 | 0.000 | 0.000 | 0.000 | 0.000 |
| CaO | 0.196 | 0.195 | 0.190 | 0.189 | 0.188 | 0.194 | 0.190 | 0.189 | 0.189 | 0.194 |
| $SnO_2$ | 0.147 | 0.147 | 0.142 | 0.142 | 0.141 | 0.145 | 0.142 | 0.142 | 0.142 | 0.146 |
| $WO_3$ | 0.000 | 0.000 | 3.085 | 3.071 | 3.753 | 3.870 | 5.695 | 5.668 | 0.000 | 0.000 |
| $MoO_3$ | 2.945 | 3.419 | 0.000 | 0.000 | 0.000 | 0.000 | 0.000 | 0.000 | 3.071 | 3.403 |
| $P_2O_5$ | 1.905 | 1.895 | 0.000 | 0.000 | 0.000 | 1.877 | 1.841 | 1.833 | 0.000 | 1.886 |
| $Fe_2O_3$ | 0.491 | 0.488 | 0.003 | 0.003 | 0.003 | 0.003 | 0.002 | 0.002 | 0.003 | 0.000 |
| $MnO_2$ | 0.000 | 0.000 | 0.475 | 0.945 | 0.938 | 0.967 | 0.949 | 1.417 | 0.945 | 0.972 |
| $F^-$ | 0.000 | 0.000 | 5.411 | 5.385 | 5.347 | 0.000 | 0.000 | 0.000 | 5.385 | 0.000 |
| Total | 100.00 | 100.00 | 100.00 | 100.00 | 100.00 | 100.00 | 100.00 | 100.00 | 100.00 | 100.00 |

In this example, the compositions of Table 2 were prepared by weighing the batch constituents, mixing them by turbula or ball mill and melting for 6-24 hours at temperatures between 1350° C. to 1650° C. in Pt crucibles (silica, refractory or Pt/Rh crucibles can also be employed for the compositions of the disclosure). In some instances, a double melting approach was employed to improve melt homogeneity. The double melting involved pouring the molten glass into water, which rapidly quenched it resulting in the formation of small, fractured granules of the particular composition. The granules were then re-loaded into the crucible and melted again. Alternatively, these compositions could have been subjected to mechanical stirring to improve homogeneity with similar effect. The glasses were then cast onto a metal table to produce an 'optical pour' or 'patty' of glass. Some melts were cast onto a steel table and then rolled into a sheet form using a steel roller. The glass was then annealed at temperatures between 400° C. to 550° C. for annealing times between 30 minutes and 150 minutes.

Some of the samples of the as-cast compositions of this example listed in Table 2 developed crystalline phases that gave rise to pure black or sharp cutoff wavelength characteristics upon the foregoing melting and the annealing steps, without the need for an additional, secondary heat treatment. The remaining compositions were subjected to a secondary heat treatment step that lasted for times between 30 minutes and 240 minutes at temperatures ranging from 500° C. to 575° C. in an ambient air electric oven.

Example 2

Figure 2:
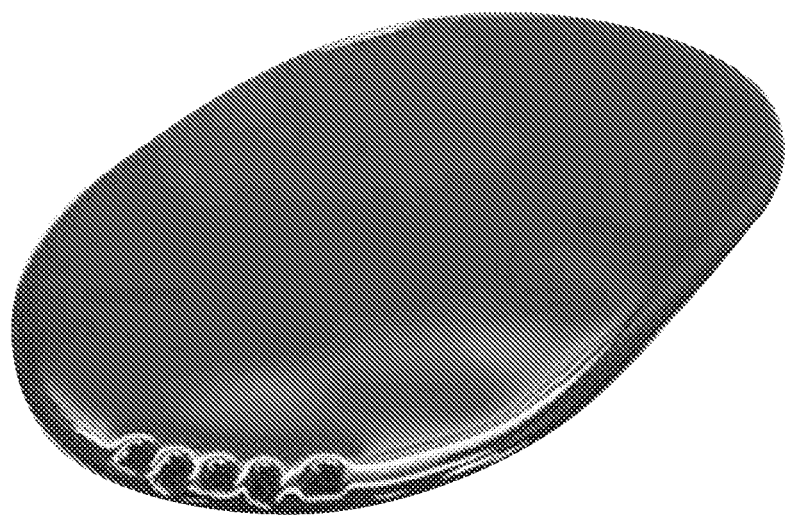
FIG. 2 is a photograph of an annealed pour of a F- and Fe-doped tungsten oxide glass-ceramic (Ex. 1-2), according to at least one example of the disclosure.

In this example, a fluorine-containing, iron-doped tungsten oxide glass-ceramic was melted and annealed according to Ex. 1-2, as outlined above in Table 2. As shown in FIG. 2, a photograph of the resulting glass-ceramic material (i.e., as an annealed optical pour) demonstrates that it has a pure black characteristic under ambient lighting, which is evident without any additional heat treatment.

Example 3

Figure 3A:
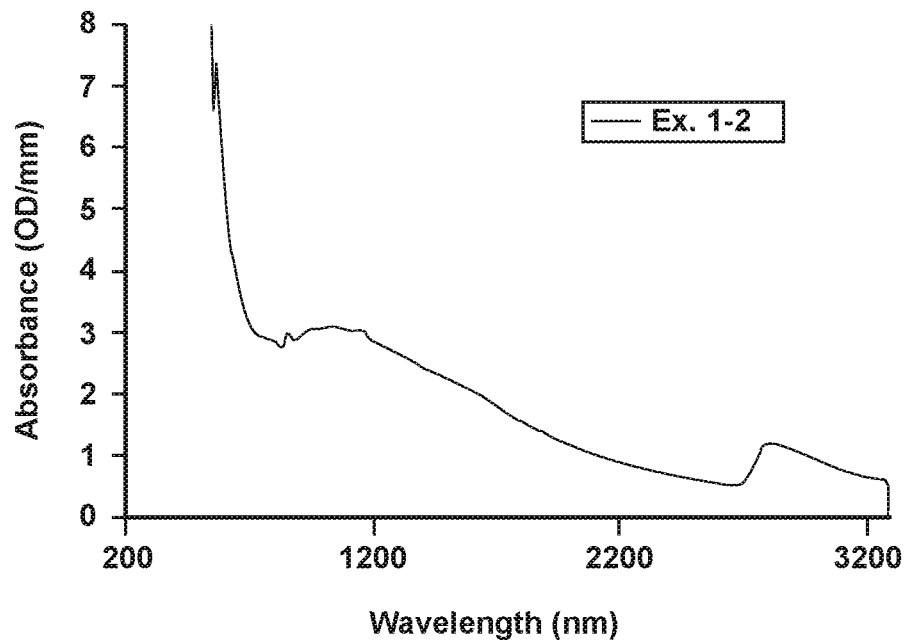
FIGS. 3A and 3B are plots of absorbance in OD/mm and transmittance at a 0.5 mm path length as a function of wavelength, respectively, of the glass-ceramic of FIG. 2, as heat treated at 550° C. for 105 minutes, cooled to 475° C. at 1° C./min, and cooled at a furnace rate to ambient temperature, according to at least one example of the disclosure.
Figure 3B:
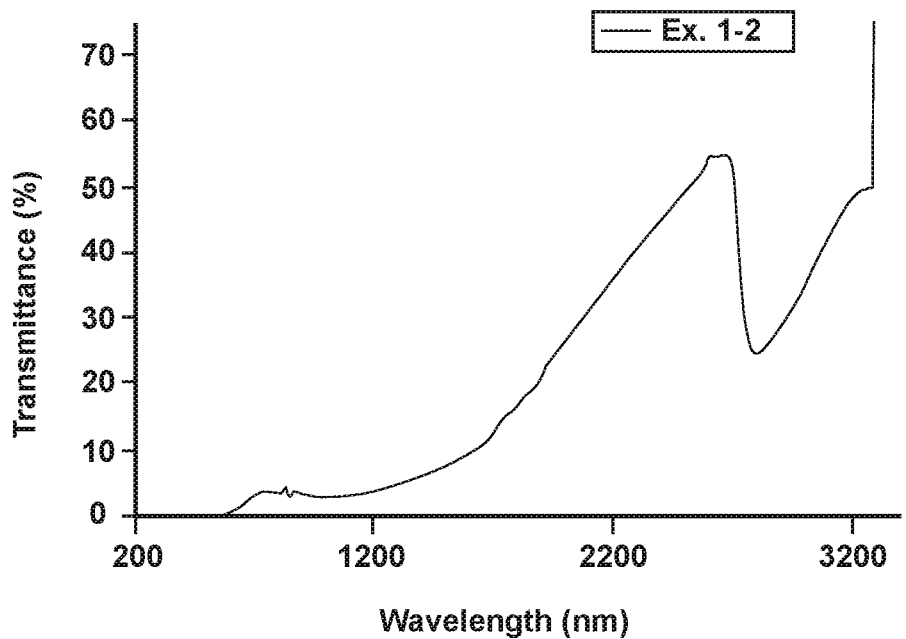

After melting and annealing, the material from Example 2 was subjected to a heat treatment at 525° C. for 105 minutes, cooled to 475° C. at 1° C./min, and then cooled at a furnace rate to room temperature in an ambient air electric oven. As shown in FIGS. 3A and 3B, respectively, the resulting material was measured for optical absorbance and transmittance. In particular, FIGS. 3A and 3B are plots of absorbance (OD/mm) and transmittance (%) as a function of wavelength (from 200 nm to 3200 nm) at a 0.5 mm path length, respectively. Further, the optical absorbance data from FIG. 3A was evaluated to obtain average, minimum and maximum absorbance values for the material of this example at particular wavelength ranges (e.g., UV, VIS, and IR/NIR) regimes) and tabulated below in Table 3.

Note that in some instances, the samples were so strong in absorbance at conventional thicknesses (e.g., 0.2 to 0.7 mm), they transmitted so little light that they were below the detector limit. Accordingly, for certain average and minimum values in Table 4 (and the subsequent tables in this disclosure), they are reported as absorbance greater than the specified value (e.g., >5) indicating that the sample absorbs at least the specified value in units of OD/mm.

TABLE 3

Optical absorbance (OD/mm) data for Ex. 1-2, as heat treated at 525° C. for 105 minutes

| Wavelength range (nm) | Avg. absorbance | Min. absorbance | Max. absorbance |
|---|---|---|---|
| 300-400 | >7 | 8.2 | >7 |
| 400-700 | >7 | 3.1 | >7 |
| 700-1500 | 1.41 | 2.2 | 3.1 |
| 700-2000 | 0.98 | 0.6 | 3.1 |

Example 4

Figure 4A:
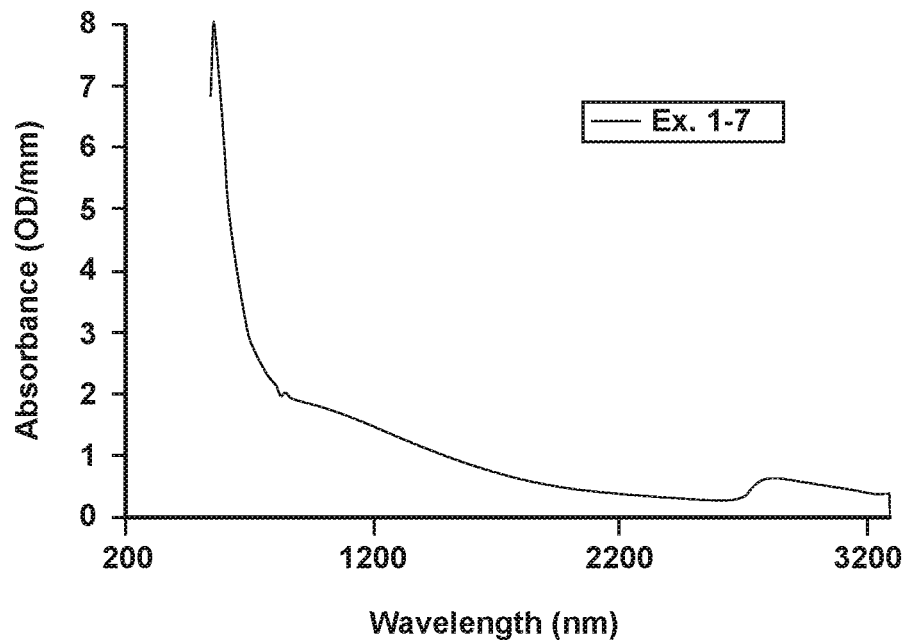
FIGS. 4A and 4B are plots of absorbance in OD/mm and transmittance at a 0.5 mm path length as a function of wavelength, respectively, of a Fe-doped tungsten oxide glass-ceramic (Ex. 1-7), as heat treated at 550° C. for 240 minutes, cooled to 475° C. at 1° C./min, and cooled to at a furnace rate to ambient temperature, according to at least one example of the disclosure.
Figure 4B:
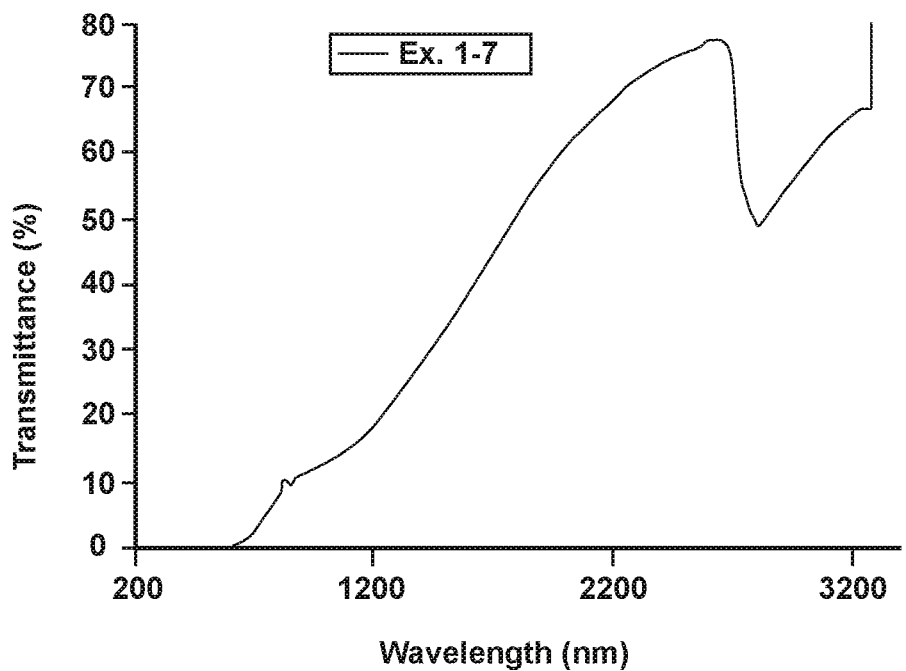

In this example, a fluorine-free, iron-doped tungsten oxide glass-ceramic was melted and annealed according to Ex. 1-7, as outlined above in Table 2. After melting and annealing, the material from this example was subjected to a heat treatment at 550° C. for 240 minutes, cooled to 475° C. at 1° C./min, and then cooled at a furnace rate to room temperature in an ambient air electric oven. As shown in FIGS. 4A and 4B, respectively, the resulting material was measured for optical absorbance and transmittance. In particular, FIGS. 4A and 4B are plots of absorbance (OD/mm) and transmittance (%) as a function of wavelength at a 0.5 mm path length, respectively. Further, the optical absorbance data from FIG. 4A was evaluated to obtain average, minimum and maximum absorbance values for the material of this example at particular wavelength ranges (e.g., UV, VIS, and IR/NIR) regimes) and tabulated below in Table 4.

TABLE 4

Optical absorbance (OD/mm) data for Ex. 1-7, as heat treated at 550° C. for 240 minutes

| Wavelength range (nm) | Avg. absorbance | Min. absorbance | Max. absorbance |
|---|---|---|---|
| 300-400 | >9 | 8.9 | >9 |
| 400-700 | >7 | 2.8 | >7 |
| 700-1500 | 1.64 | 0.9 | 2.8 |
| 700-2000 | 1.00 | 0.2 | 2.8 |

Example 5

Figure 5A:
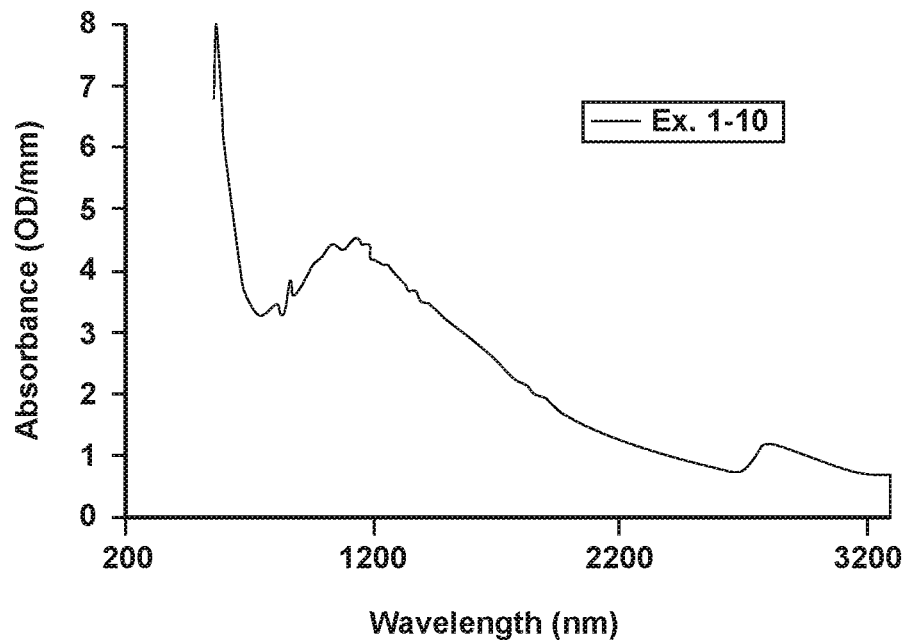
FIGS. 5A and 5B are plots of absorbance in OD/mm and transmittance at a 0.5 mm path length as a function of wavelength, respectively, of a F- and Fe-doped molybdenum oxide glass-ceramic (Ex. 1-10), as heat treated at 550° C. for 240 minutes, cooled to 475° C. at 1° C./min, and cooled to at a furnace rate to ambient temperature, according to at least one example of the disclosure.
Figure 5B:
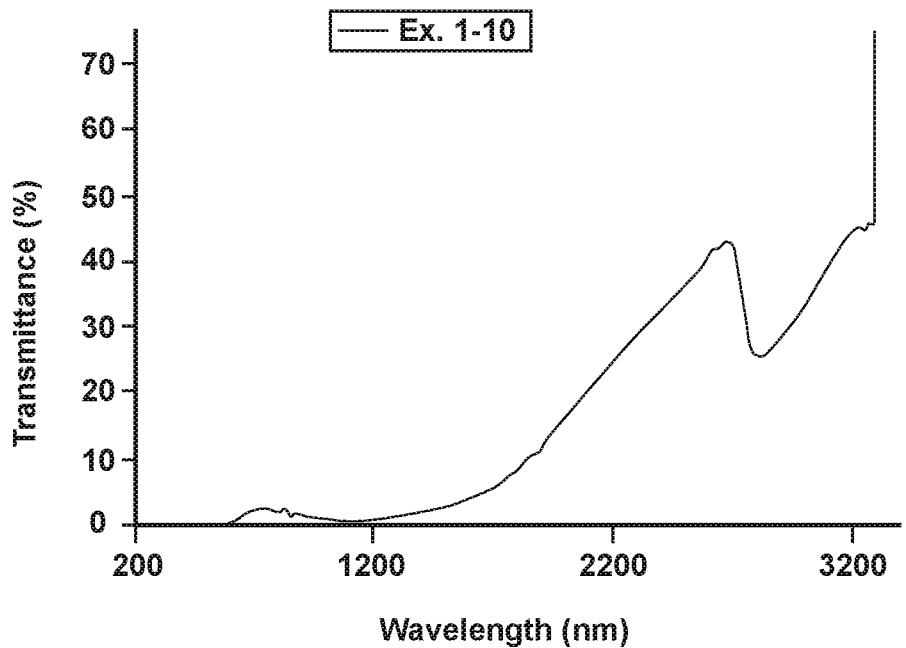

In this example, a fluorine-doped, iron-doped molybdenum oxide glass-ceramic was melted and annealed according to Ex. 1-10, as outlined above in Table 2. After melting and annealing, the material from this example was subjected to a heat treatment at 550° C. for 240 minutes, cooled to 475° C. at 1° C./min, and then cooled at a furnace rate to room temperature in an ambient air electric oven. As shown in FIGS. 5A and 5B, respectively, the resulting material was measured for optical absorbance and transmittance. In particular, FIGS. 5A and 5B are plots of absorbance (OD/mm) and transmittance (%) as a function of wavelength at a 0.5 mm path length, respectively. Further, the optical absorbance data from FIG. 5A was evaluated to obtain average, minimum and maximum absorbance values for the material of this example at particular wavelength ranges (e.g., UV, VIS, and IR/NIR) regimes) and tabulated below in Table 5.

TABLE 5

Optical absorbance (OD/mm) data for Ex. 1-10, as heat treated at 550° C. for 240 minutes

| Wavelength range (nm) | Avg. absorbance | Min. absorbance | Max. absorbance |
|---|---|---|---|
| 300-400 | >8 | 4 | >8 |
| 400-700 | >8 | 3.4 | >8 |
| 700-1500 | 3.9 | 3.2 | 4.6 |
| 700-2000 | 2.7 | 0.9 | 4.6 |

Example 6

Figure 6A:
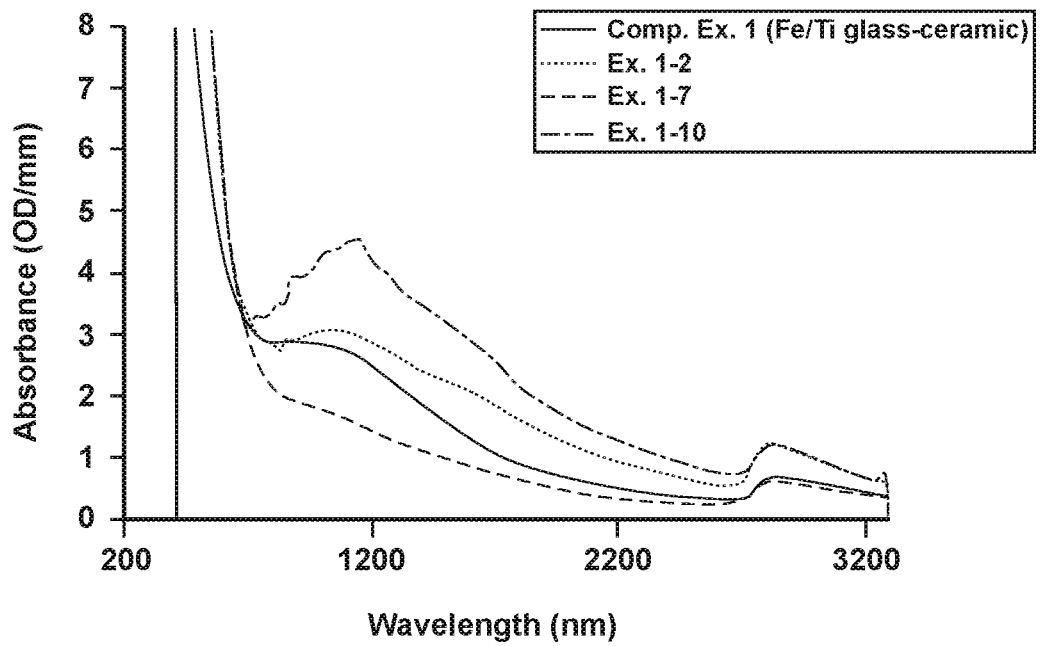
FIGS. 6A and 6B are plots of absorbance in OD/mm and transmittance at a 0.5 mm path length as a function of wavelength, respectively, of the glass-ceramics of FIGS. 3A-5B (Exs. 1-2, 1-7, and 1-10) and a comparative Fe- and Ti-doped glass-ceramic, according to examples of the disclosure.
Figure 6B:
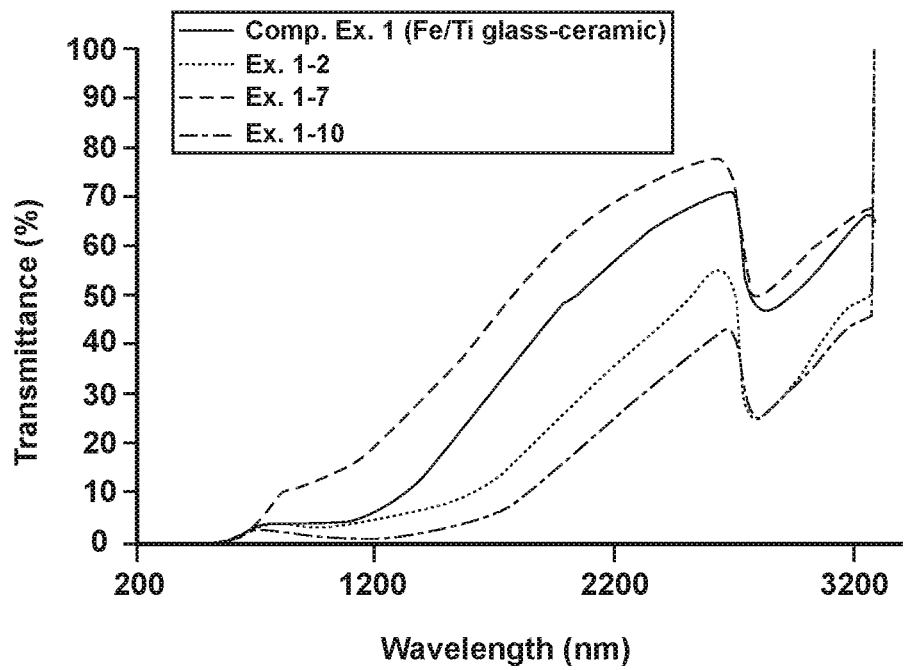
Figure 6C:
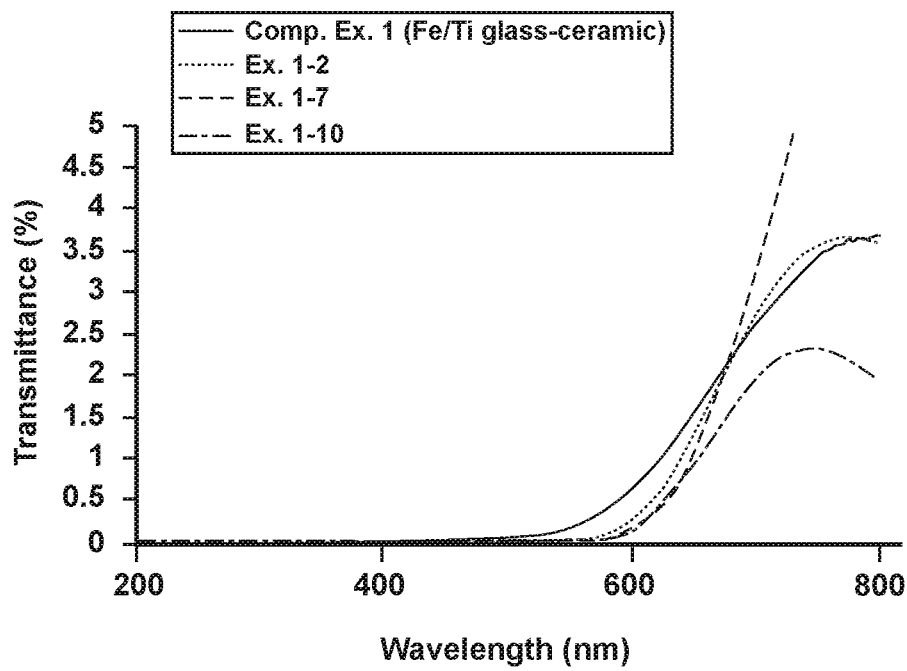
FIG. 6C is a plot of transmittance as a function of wavelength in the visible spectrum at a 0.5 mm path length, respectively, of the glass-ceramics of FIGS. 3A-5B (Exs. 1-2, 1-7, and 1-10) and a comparative Fe- and Ti-doped glass-ceramic, according to examples of the disclosure.

In this example, the glass-ceramics of Examples 3-5 (Exs. 1-2, 1-7 and 1-10) are compared against a comparative glass-ceramic composition (Comp. Ex. 1) doped with iron and titanium oxide, but lacks tungsten and molybdenum oxide. Comp. Ex. 1 has the following compositions (in as-batched mol %): 63.82% $SiO_2$; 13.89% $Al_2O_3$; 5.10% $B_2O_3$; 13.76% $Na_2O$; 0.014% $K_2O$; 1.74% MgO; 0.032% CaO; 0.060% SnO2; 0.029% $ZrO_2$; 0.076% $TiO_2$; 0.564% $Fe_2O_3$; and 0.005% MnO. In particular, FIGS. 6A and 6B are plots of absorbance (OD/mm) and transmittance (%) as a function of wavelength (from 200 nm to 3200 nm) at a 0.5 mm path length, respectively, of these materials. In addition, FIG. 6C is a plot of absorbance (OD/mm) and transmittance (%) as a function of wavelength (from 400 nm to 800 nm) in the visible spectrum at a 0.5 mm path length, respectively, of these same materials. As is evident from the data in these figures, these samples exhibit comparable absorbance and transmittance characteristics across the UV, VIS and NIR spectra of the measurements. With regard to heat treatment, however, the samples of Examples 3-5 were heat treated at 525° C. for 105 minutes, 550° C. for 240 minutes and 550° C. for 240 minutes, respectively. In comparison, the comparative glass-ceramic required a heat treatment at 630° C. for two hours, followed by a further ramp to 750° C. with a four hour hold. As such, the samples of Examples 3-5 required 1.5× to 3.4× shorter heat treatment times at temperatures 80° C. to 200° C. lower than those employed with the comparative glass-ceramic.

Referring again to FIG. 6B, average transmittance (%) data for the 0.5 mm path length samples is tabulated below in Table 6 for the four samples of this example over the UV (200 nm to 400 nm), VIS (400 nm to 700 nm) and NIR (700 nm to 1500 nm; and 700 nm to 2500 nm) wavelength regimes. As is evident from the data in Table 6, these samples exhibit comparable transmittance characteristics across the UV, VIS and NIR spectra of the measurements.

TABLE 6

Average transmittance (%) data for Exs. 1-2, 1-7, 1-10 and Comp. Ex. 1

| Wavelength range (nm) | Ex. 1-2 | Ex. 1-7 | Ex. 1-10 | Comp. Ex. 1 |
|---|---|---|---|---|
| 200-400 | 0.00 | 0.00 | 0.00 | 0.00 |
| 400-700 | 0.50 | 0.47 | 0.36 | 0.61 |
| 700-1500 | 4.06 | 17.31 | 1.34 | 6.48 |
| 700-2500 | 16.58 | 40.33 | 10.12 | 19.70 |

Example 7

In this example, manganese-doped tungsten oxide glass-ceramic compositions were melted and annealed according to Exs. 1-13, 1-14 and 1-15, as outlined above in Table 2.

Figure 7:
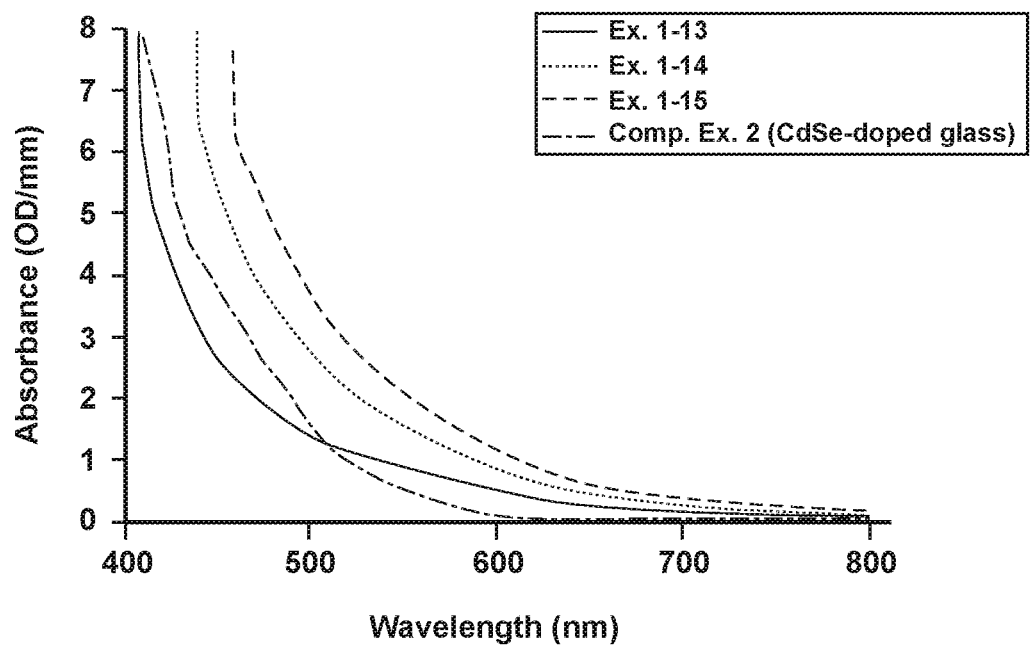
FIG. 7 is a plot of absorbance in OD/mm as a function of wavelength of F- and Mn-doped tungsten oxide glass-ceramics (Exs. 1-13, 1-14, and 1-15) heat treated at 550° C. for 240 minutes, cooled to 475° C. at 1° C./min, and cooled to at a furnace rate to ambient temperature, and a comparative CdSe-doped glass, according to examples of the disclosure.

After melting and annealing, the material from this example was subjected to a heat treatment at 550° C. for 240 minutes, cooled to 475° C. at 1° C./min, and then cooled at a furnace rate to room temperature in an ambient air electric oven. These glass-ceramic samples were compared against a conventional CdSe glass (Comp. Ex. 2). As shown in FIG. 7, the samples of this example were measured for optical absorbance. In particular, FIG. 7 is a plot of absorbance (OD/mm) as a function of wavelength at a 0.5 mm path length. Further, the optical absorbance data from FIG. 7 was evaluated to obtain average, minimum and maximum absorbance values for the materials of this example (Exs. 1-13, 1-14 and 1-15) at particular wavelength ranges (e.g., UV, VIS, and IR/NIR) regimes) and tabulated below in Tables 7A-7C. As is evident from the data in FIG. 7 and Tables 7A-7C, the glass-ceramic compositions of this example derive their color from a manganese tungstate ($MnWO_4$) and exhibit comparable color and absorbance characteristics as the RCRA-regulated comparative CdSe glass.

TABLE 7A

Optical absorbance (OD/mm) for Ex. 1-13, as heat treated at 550° C. for 240 minutes

| Wavelength range (nm) | Avg. absorbance | Min. absorbance | Max. absorbance |
|---|---|---|---|
| 300-400 | >9 | 8.7 | >9 |
| 400-700 | 1.4 | 0.2 | >9 |
| 700-1500 | 0.12 | 0.1 | 0.2 |
| 700-2000 | 0.11 | 0.08 | 0.2 |

TABLE 7B

Optical absorbance (OD/mm) for Ex. 1-14, as heat treated at 550° C. for 240 minutes

| Wavelength range (nm) | Avg. absorbance | Min. absorbance | Max. absorbance |
|---|---|---|---|
| 300-400 | >11 | 8.7 | >11 |
| 400-700 | 1.91 | 0.3 | >11 |
| 700-1500 | 0.13 | 0.1 | 0.3 |
| 700-2000 | 0.11 | 0.08 | 0.3 |

TABLE 7C

Optical absorbance (OD/mm) for Ex. 1-15, as heat treated at 550° C. for 240 minutes

| Wavelength range (nm) | Avg. absorbance | Min. absorbance | Max. absorbance |
|---|---|---|---|
| 300-400 | >9 | 9.2 | >9 |
| 400-700 | 2.15 | 0.4 | >9 |
| 700-1500 | 0.17 | 0.1 | 0.4 |
| 700-2000 | 0.13 | 0.09 | 0.4 |

Example 8

Figure 8A:
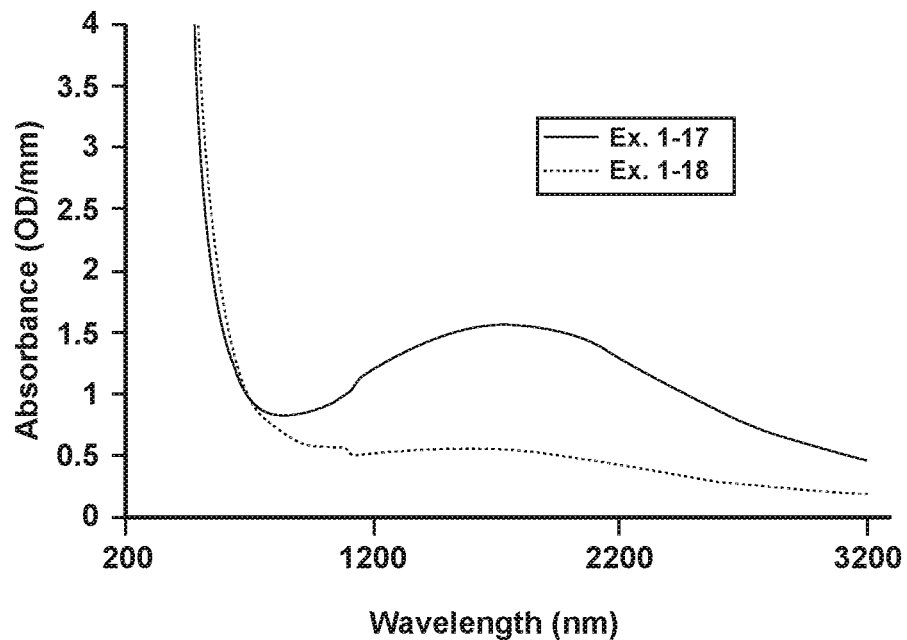
FIGS. 8A and 8B are plots of absorbance in OD/mm and transmittance at a 0.5 mm path length as a function of wavelength, respectively, of Mn-doped tungsten oxide glass-ceramics (Exs. 1-17 and 1-18), as heat treated at 550° C. for 240 minutes, cooled to 475° C. at 1° C./min, and cooled to at a furnace rate to ambient temperature, according to at least one example of the disclosure.
Figure 8B:
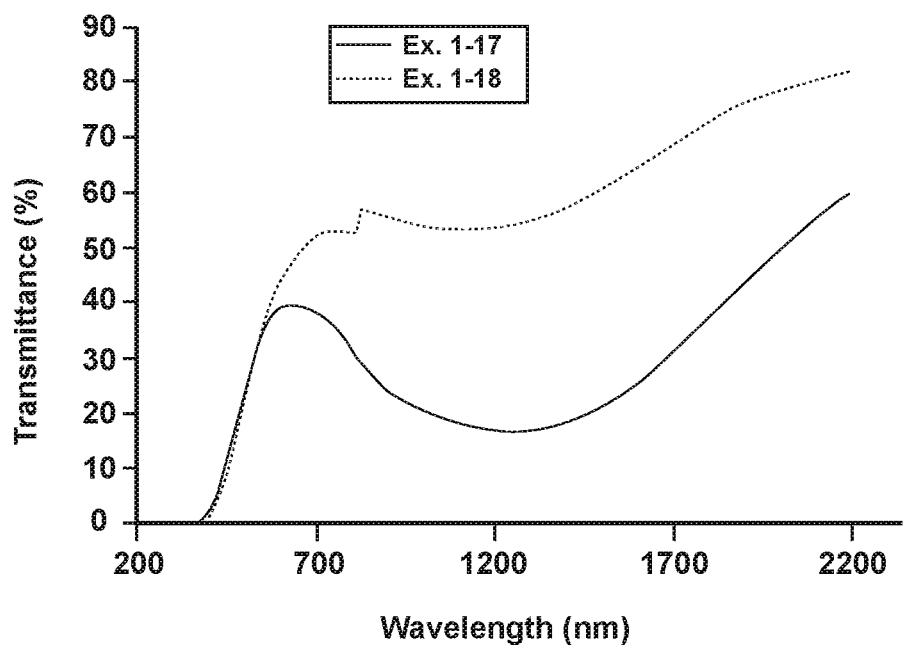

In this example, fluorine-free manganese-doped tungsten oxide glass-ceramic compositions were melted and annealed according to Exs. 1-17 and 1-18, as outlined above in Table 2. After melting and annealing, the material from this example was subjected to a heat treatment at 550° C. for 240 minutes, cooled to 475° C. at 1° C./min, and then cooled at a furnace rate to room temperature in an ambient air electric oven. As shown in FIGS. 8A and 8B, the samples of this example were measured for optical absorbance and transmittance. In particular, FIGS. 8A and 8B are plots of absorbance (OD/mm) and transmittance (%) as a function of wavelength at a 0.5 mm path length. Further, the optical absorbance data from FIG. 8A was evaluated to obtain average, minimum and maximum absorbance values for the materials of this example (Exs. 1-17 and 1-18) at particular wavelength ranges (e.g., UV, VIS, and IR/NIR) regimes) and tabulated below in Tables 8A and 8B. As is evident from the data in FIGS. 8A and 8B, and Tables 8A and 8B, the glass-ceramic compositions of this example are well-suited for ophthalmic eyewear as they exhibit moderate to low visible transmittance and IR absorbance. Their absorbance is attributed to the formation of a manganese-tungstate-solid solution phase (i.e. Hübnerite).

TABLE 8A

Optical absorbance (OD/mm) for Ex. 1-17, as heat treated at 550° C. for 240 minutes

| Wavelength range (nm) | Avg. absorbance | Min. absorbance | Max. absorbance |
|---|---|---|---|
| 300-400 | >9.1 | 3.534 | >9.1 |
| 400-700 | 1.26 | 0.080 | 3.5 |
| 700-1500 | 1.35 | 0.83 | 1.54 |
| 700-2000 | 0.98 | 0.83 | 1.54 |

TABLE 8B

Optical absorbance (OD/mm) for Ex. 1-18, as heat treated at 550° C. for 240 minutes

| Wavelength range (nm) | Avg. absorbance | Min. absorbance | Max. absorbance |
|---|---|---|---|
| 300-400 | >9.7 | 4.46 | >9.7 |
| 400-700 | 1.31 | 0.56 | 4.46 |
| 700-1500 | 0.52 | 0.44 | 0.56 |
| 700-2000 | 0.37 | 0.13 | 0.56 |

Example 9

Figure 9A:
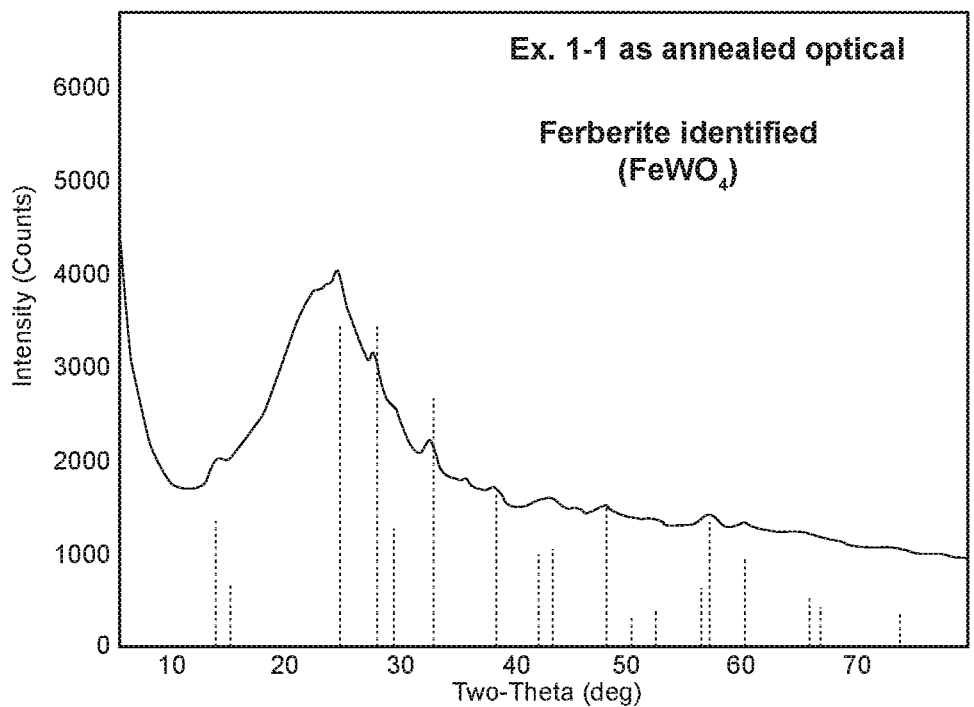
FIGS. 9A-9G are x-ray powder diffraction (XRD) plots of F- and Fe-doped tungsten oxide glass-ceramics (Exs. 1-1 to 1-5), as subjected to varying heat treatments, according to examples of the disclosure.
Figure 9B:
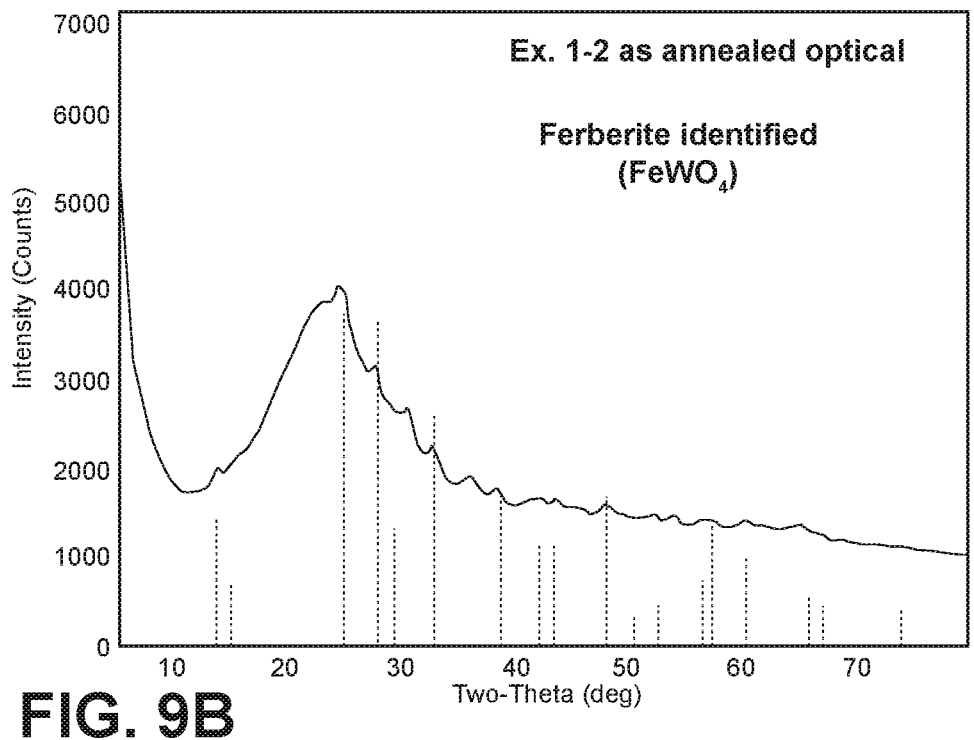
Figure 9C:
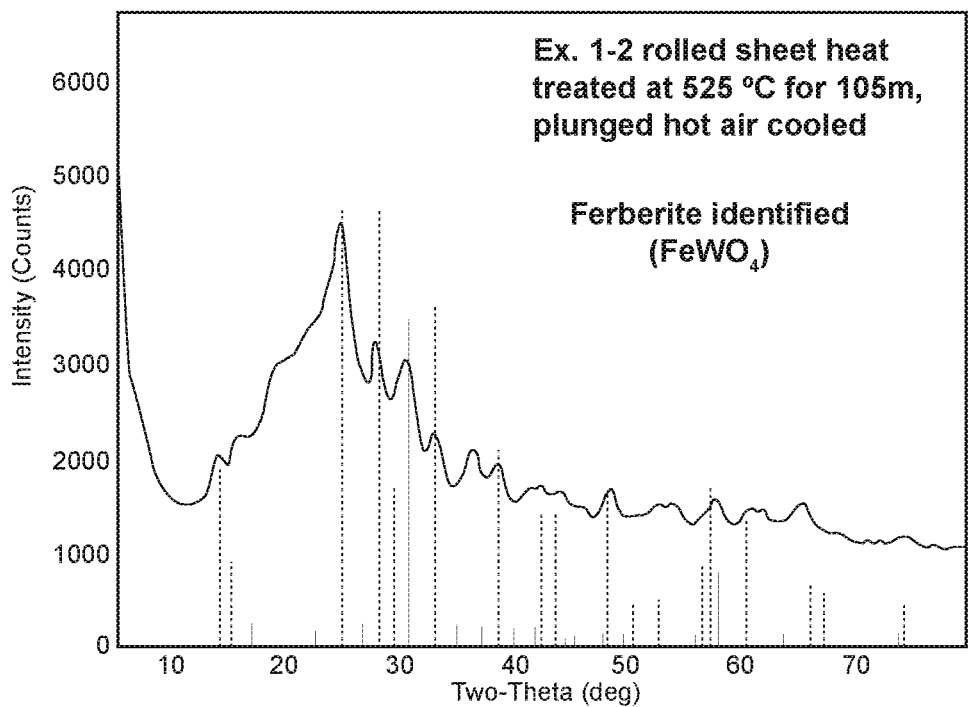
Figure 9D:
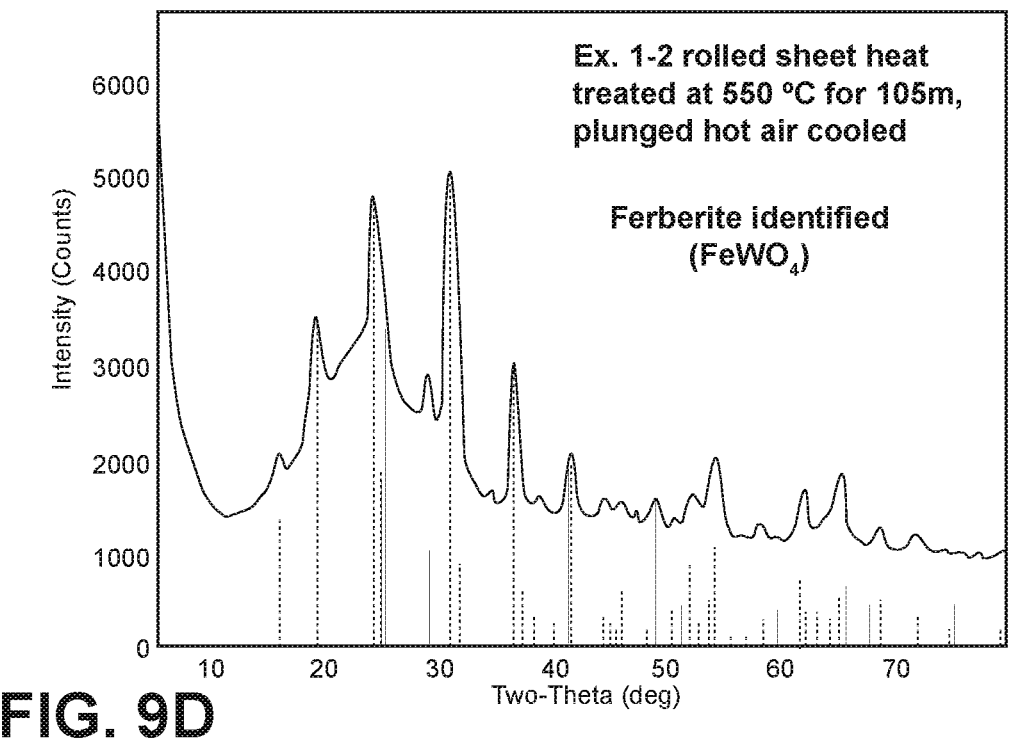
Figure 9E:
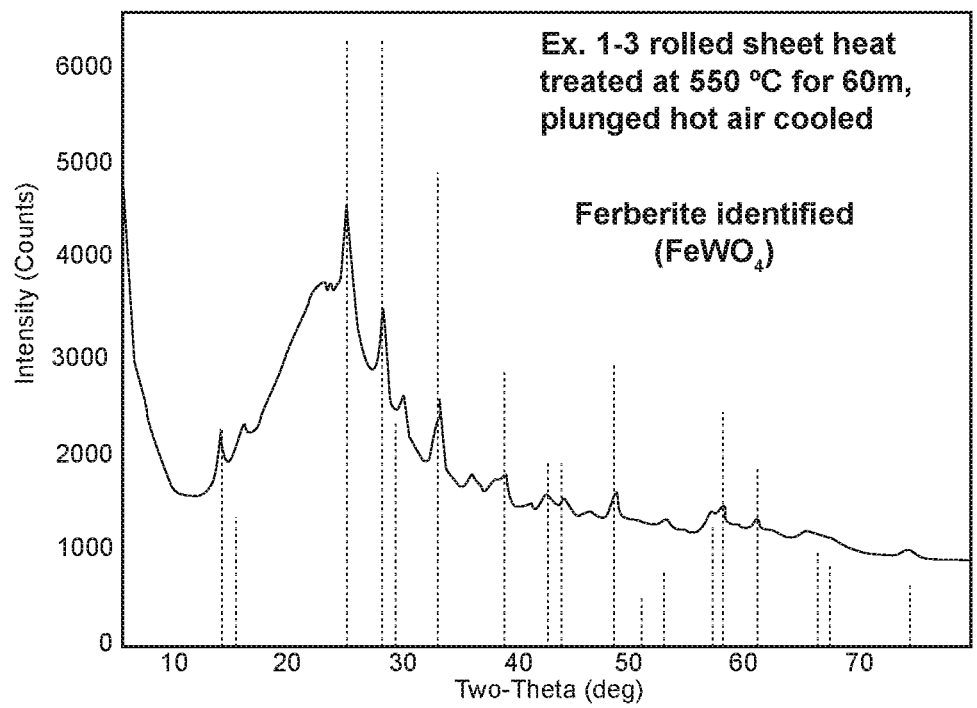
Figure 9F:
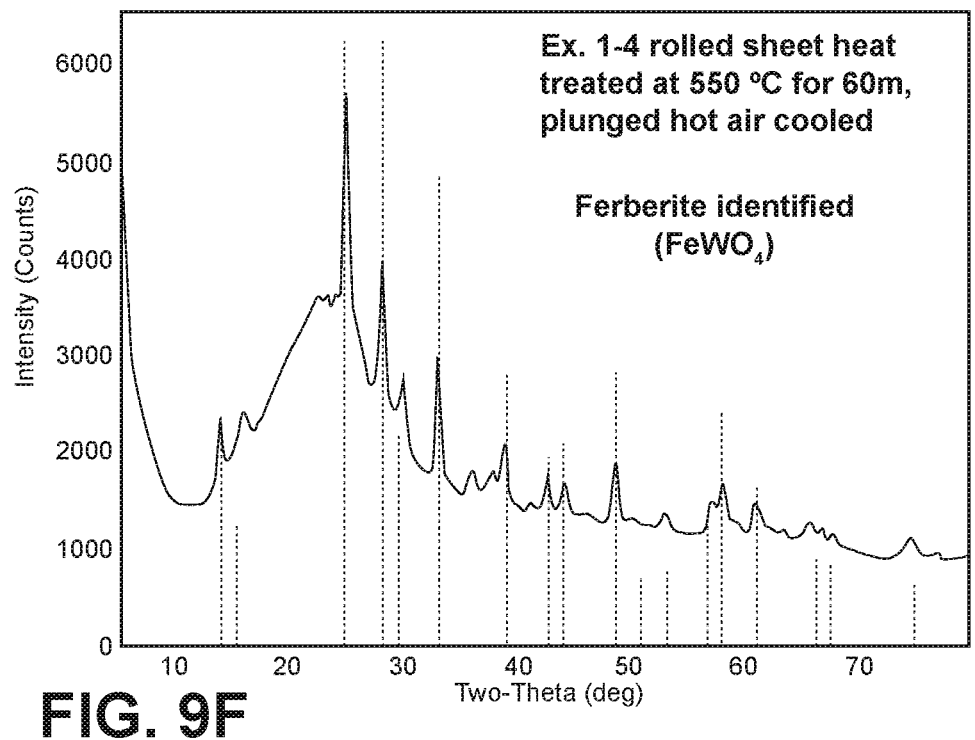
Figure 9G:
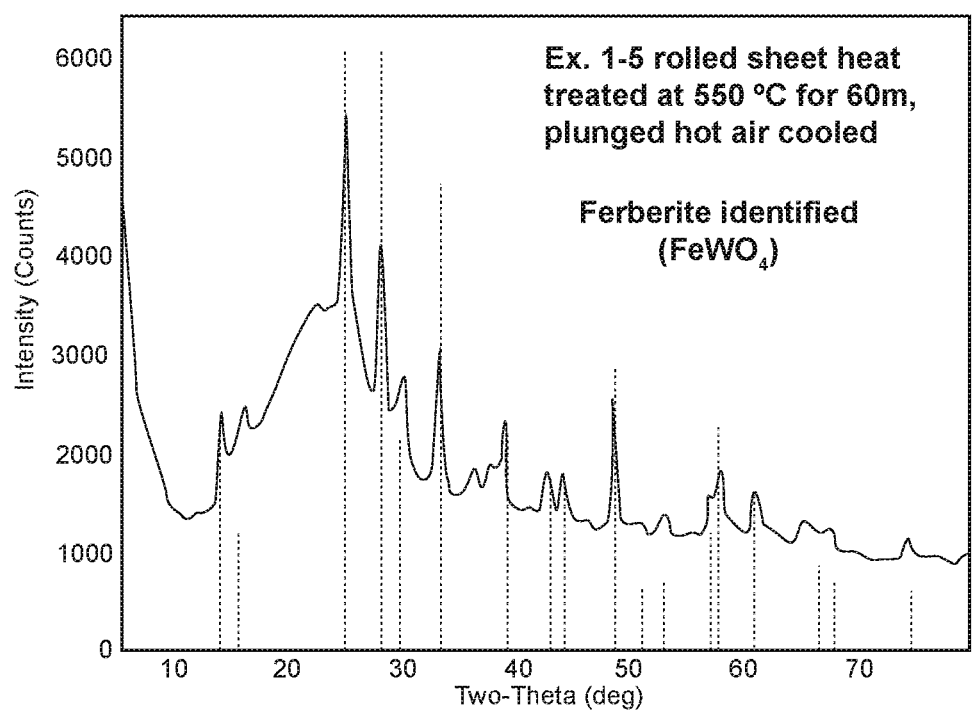

In this example, iron-doped tungsten oxide glass-ceramic samples were prepared according to Table 2 (Exs. 1-1 to 1-5) and subjected to powder x-ray diffraction (XRD) analysis, as depicted in FIGS. 9A-9G. Some of the samples were maintained in an annealed condition without a subsequent heat treatment: Exs. 1-1 and 1-2, as shown in FIGS. 9A and 9B. The remainder of the samples were subjected to a subsequent heat treatment: Ex. 1-2 at 525° C. for 105 minutes, as shown in FIG. 9C; Ex. 1-2 at 550° C. for 105 minutes, as shown in FIG. 9D; Ex. 1-3 at 550° C. for 60 minutes, as shown in FIG. 9E; Ex. 1-4 at 550° C. for 60 minutes, as shown in FIG. 9F; and Ex. 1-5 at 550° C. for 60 minutes, as shown in FIG. 9G. Each of the samples, Exs. 1-2 to 1-5, were cooled in ambient air followed by the heat treatment at the specified temperature (e.g., Ex. 1-5, 550° C. for 60 minutes, followed by cooling in ambient air). As is evident from the figures, all of the glass-ceramic compositions of the example exhibited an XRD signature for magnesium tungstate ($MgWO_4$) as the primary crystalline phase. Since these compositions have only trace amounts of Mg and the d-spacing of magnesium tungstate and iron tungstate is very similar, it is believed that each of the XRD plots in FIGS. 9A-9G is indicative of the presence of iron tungstate, $FeWO_4$ (i.e., Ferberite)

Example 10

Figure 10A:
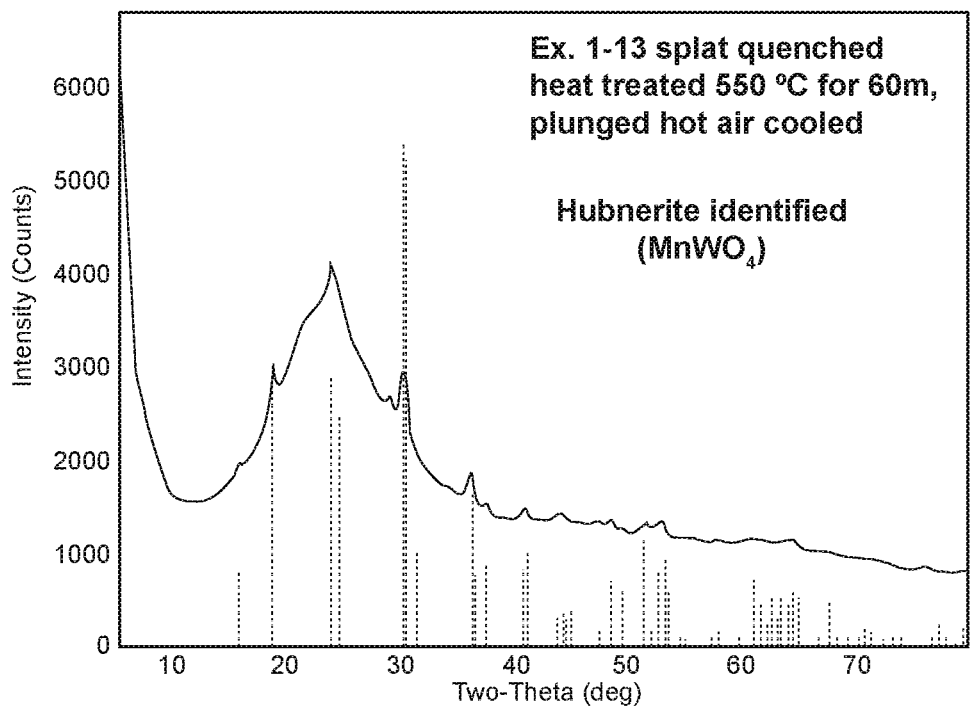
FIGS. 10A-10C are XRD plots of F- and Mn-doped tungsten oxide glass ceramics (Exs. 1-13, 1-14 and 1-15), as heat treated at 550° C. for 60 minutes and hot air-cooled to ambient temperature, according to examples of the disclosure.
Figure 10B:
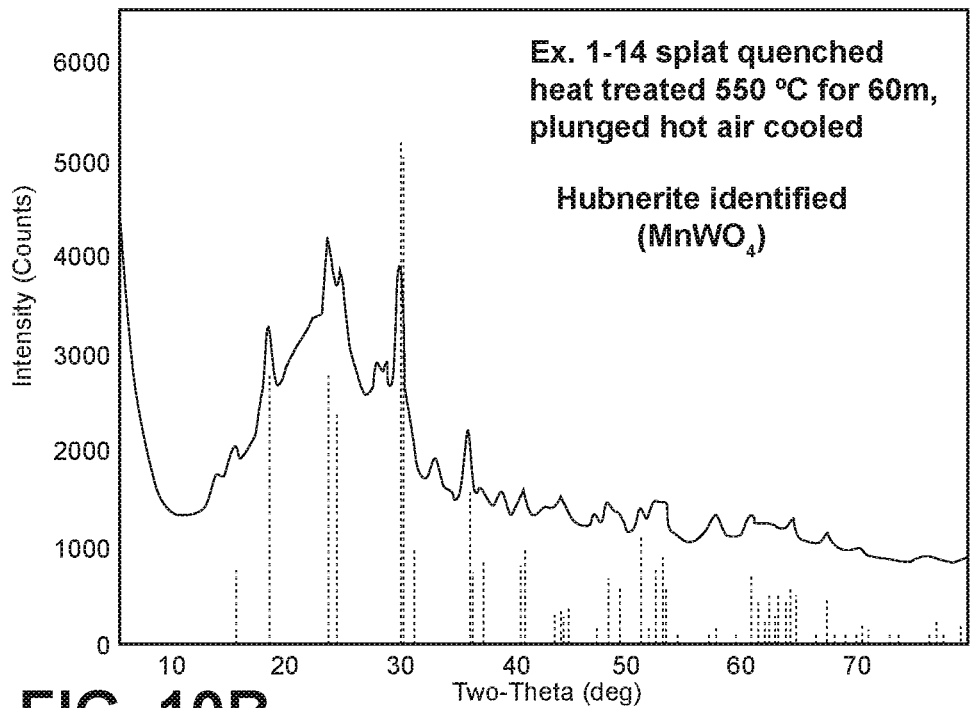
Figure 10C:
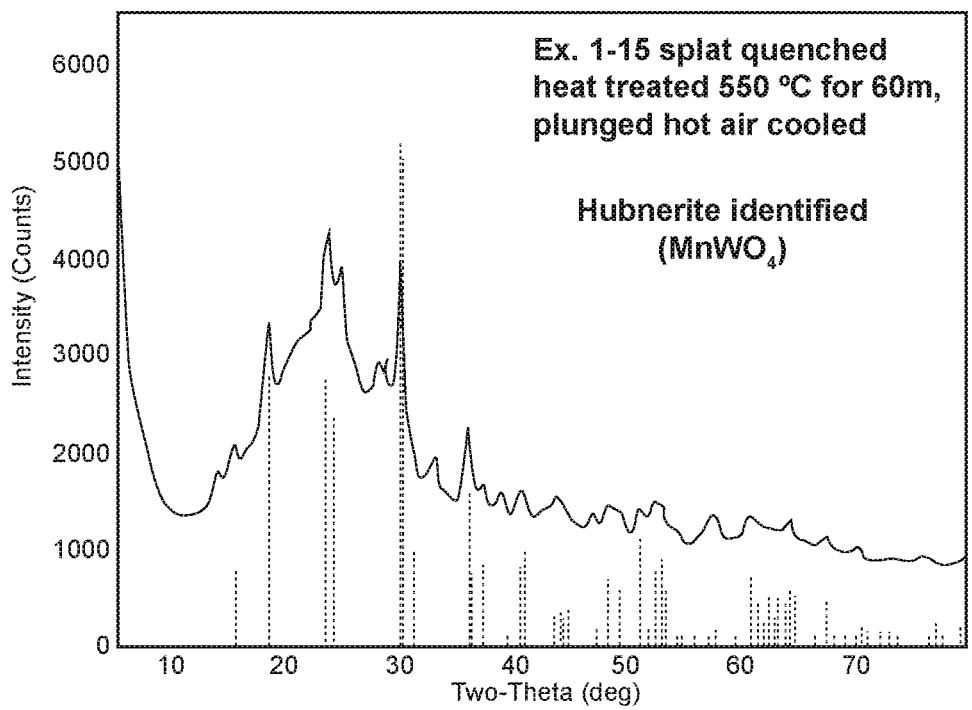

In this example, manganese-doped tungsten oxide glass-ceramic samples were prepared according to Table 2 (Exs. 1-13 to 1-15) and subjected to powder x-ray diffraction (XRD) analysis, as depicted in FIGS. 10A-10C. All of the samples were subjected to a subsequent heat treatment: Ex. 1-13 at 550° C. for 60 minutes, followed by cooling in ambient air, as shown in FIG. 10A; Ex. 1-14 at 550° C. for 60 minutes, followed by cooling in ambient air, as shown in FIG. 10B; and Ex. 1-15 at 550° C. for 60 minutes, followed by cooling in ambient air, as shown in FIG. 10C. As is evident from the figures, all of the glass-ceramic compositions of the example exhibited an XRD signature for manganese tungstate, $MnWO_4$ (i.e., Hübnerite).

Example 11

Figure 11A:
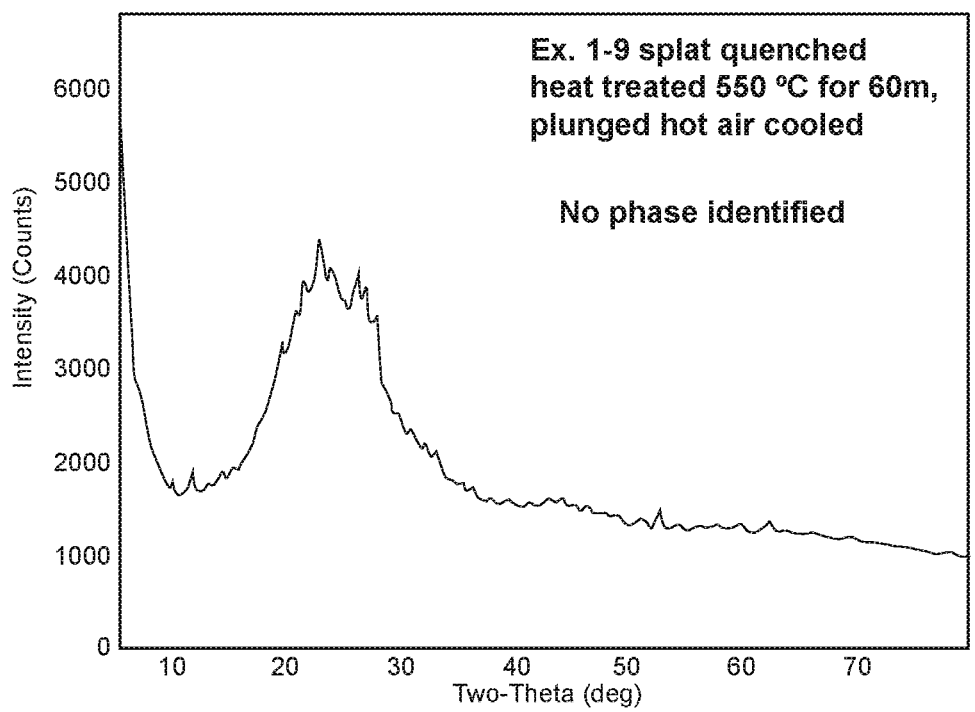
FIGS. 11A-11C are XRD plots of Fe-doped and Mn-doped molybdenum oxide glass ceramics (Exs. 1-9, 1-10 and 1-19), as heat treated at 550° C. for 60 minutes and hot air-cooled to ambient temperature, according to examples of the disclosure.
Figure 11B:
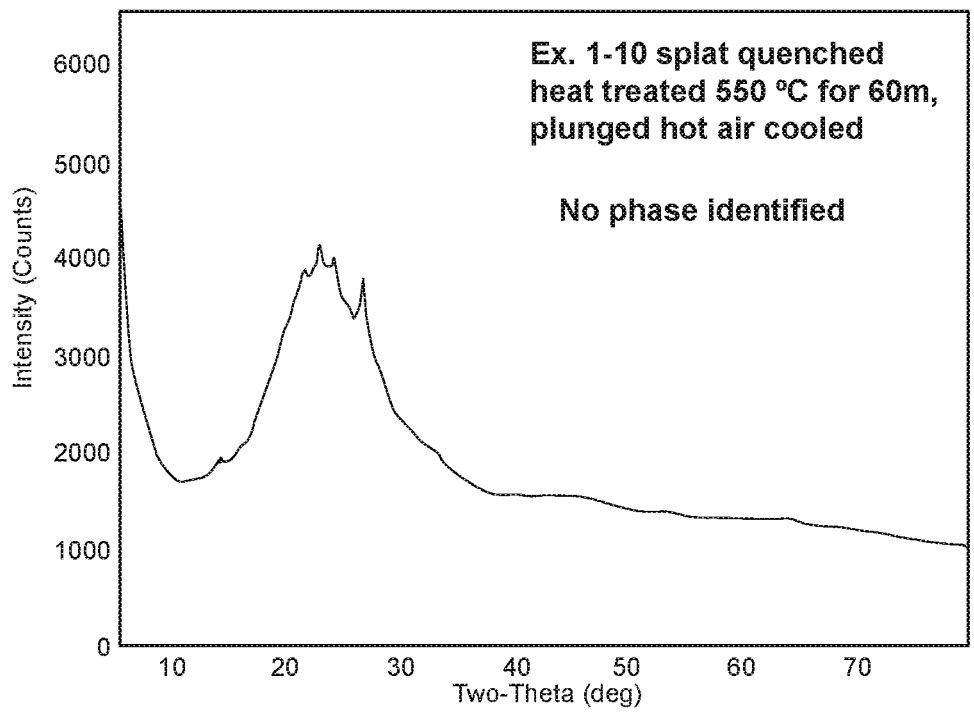
Figure 11C:
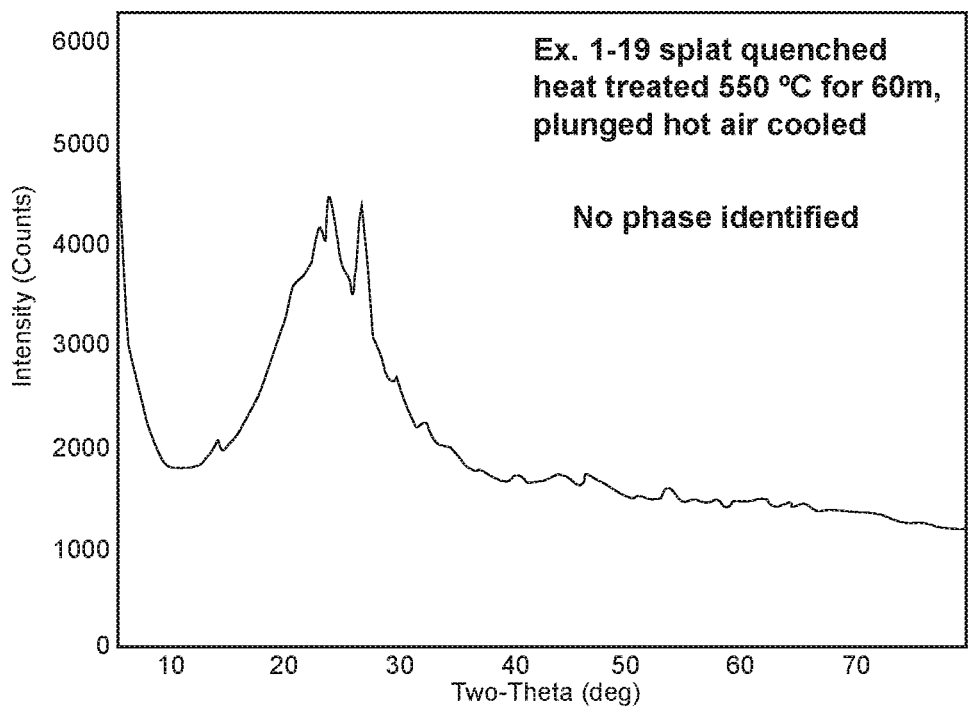

In this example, iron- and manganese-doped molybdenum oxide glass-ceramic samples were prepared according to Table 2 (Exs. 1-9, 1-10 and 1-19) and subjected to powder x-ray diffraction (XRD) analysis, as depicted in FIGS. 11A-11C. All of the samples were subjected to a subsequent heat treatment: Ex. 1-9 at 550° C. for 60 minutes, followed by cooling in ambient air, as shown in FIG. 11A; Ex. 1-10 at 550° C. for 60 minutes, followed by cooling in ambient air, as shown in FIG. 11B; and Ex. 1-19 at 550° C. for 60 minutes, followed by cooling in ambient air, as shown in FIG. 11C. An evaluation of the XRD data in these figures has not yet revealed the presence of a primary crystalline phase for these samples.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below, are incorporated into and constitute part of this Detailed Description.

What is claimed is:

1. An article, comprising:
   $SiO_2$ from 40 mol % to 80 mol %;
   $Al_2O_3$ from 3 mol % to 20 mol %;
   $B_2O_3$ from 3 mol % to 50 mol %;
   $WO_3$ plus $MoO_3$ from 3.5 mol % to 18 mol %;
   $Fe_2O_3$ plus $MnO_2$ from 0.1 mol % to 2 mol %;
   RO from 0.01 mol % to 0.5 mol %, wherein RO is a total amount of MgO, CaO, SrO, ZnO, and BaO; and
   $R_2O$ from 0 mol % to 15 mol %, wherein the $R_2O$ is a total amount of $Li_2O$, $Na_2O$, $K_2O$, $Rb_2O$ and $Cs_2O$,
   wherein $R_2O$—$Al_2O_3$ ranges from −12 mol % to +4 mol %.

2. The article of claim 1, further comprising:
   F from 1 mol % to 10 mol %.

3. The article of claim 1, wherein $WO_3$ is from 3 mol % to 15 mol %.

4. The article of claim 1, wherein $MoO_3$ is from 2 mol % to 15 mol %.

5. The article of claim 1, further comprising:
   $SnO_2$ from 0.01 mol % to 1 mol %.

6. The article of claim 1, wherein RO is from 0.1 mol % to 0.5 mol %.

7. The article of claim 1, wherein the article exhibits an average absorbance of at least 5 OD/mm in an ultraviolet (UV) wavelength band from 300 nm to 400 nm and an average absorbance of at least 2 OD/mm in a visible wavelength band from 400 nm to 700 nm.

8. The article of claim 1, wherein the article comprises an optical transmittance of at least 50% from 700 nm to 3000 nm and a sharp cutoff wavelength from 320 nm to 525 nm.

9. The article of claim 1, wherein the article exhibits a haze of 10% or less at a thickness of 1 mm.

10. A glass-ceramic article, comprising:
    the composition of the article of claim 1;
    at least one amorphous phase and one crystalline phase, and
    further wherein the crystalline phase comprises a plurality of crystalline precipitates homogenously distributed within a glassy phase, the plurality of crystalline precipitates comprising an oxide of at least one of the chemical form $MWO_4$ and $MMoO_4$, wherein M is $Fe^{2+}$ or $Mn^{2+}$.

11. The glass-ceramic article of claim 10, further comprising:
    one or more dopants selected from the group consisting of H, S, Cl, Ti, V, Cr, Co, Ni, Cu, Ga, Se, Br, Zr, Nb, Ru, Rh, Pd, Ag, Cd, In, Sb, Te, I, La, Ce, Pr, Nd, Sm, Eu, Gd, Tb, Dy, Ho, Er, Tm, Yb, Lu, Ta, Os, Ir, Pt, Au, Ti, Pb, Bi and U,
    wherein the one or more dopants is present from 0.0001 mol % to 0.5 mol %.

12. The glass-ceramic article of claim 10, wherein the article exhibits an average absorbance of at least 5 OD/mm in an ultraviolet (UV) wavelength band from 300 nm to 400 nm and an average absorbance of at least 2 OD/mm in a visible wavelength band from 400 nm to 700 nm.

13. The glass-ceramic article of claim 10, wherein the article comprises an optical transmittance of at least 50% from 700 nm to 3000 nm and a sharp cutoff wavelength from 320 nm to 525 nm.

14. The glass-ceramic article of claim 10, wherein the plurality of crystalline precipitates comprises a longest length dimension of from 1 nm to 500 nm, as measured by Electron Microscopy.

15. The article of claim 1, wherein $R_2O$—$Al_2O_3$ ranges from −3 mol % to +4 mol %.

16. The article of claim 1, wherein $R_2O$—$Al_2O_3$ ranges from −3 mol % to +1 mol %.

17. The article of claim 1, wherein $Al_2O_3$ ranges from 10 mol % to 15 mol %.

18. The article of claim 1, wherein $B_2O_3$ ranges from 3 mol % to 25 mol %.

19. The article of claim 1, wherein $WO_3$ plus $MoO_3$ ranges from 3.5 mol % to 8 mol %.

\* \* \* \* \*